United States Patent
Koumoudis

(10) Patent No.: US 7,788,848 B1
(45) Date of Patent: *Sep. 7, 2010

(54) GREEN WALL PLANTING MODULE, SUPPORT STRUCTURE AND IRRIGATION CONTROL SYSTEM

(75) Inventor: Sotiri Koumoudis, Baltimore, MD (US)

(73) Assignee: Victory Greenwall Systems, Inc., Baltimore, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/686,856

(22) Filed: Jan. 13, 2010

Related U.S. Application Data

(63) Continuation of application No. 12/624,084, filed on Nov. 23, 2009, and a continuation-in-part of application No. 12/612,155, filed on Nov. 4, 2009.

(60) Provisional application No. 61/253,341, filed on Oct. 20, 2009.

(51) Int. Cl.
*A01G 9/02* (2006.01)
*A01G 25/00* (2006.01)

(52) U.S. Cl. .......................................... 47/65.9; 47/82

(58) Field of Classification Search ................. 47/65.5, 47/65.9, 66.1, 66.5, 79, 82, 83, 86; 52/27, 52/36.4; 405/258.1, 280, 284, 285
See application file for complete search history.

(56) References Cited

U.S. PATENT DOCUMENTS

| | | | |
|---|---|---|---|
| 2,279,735 | A | 4/1942 | Gates |
| 4,268,994 | A | 5/1981 | Urai |
| 4,295,296 | A | 10/1981 | Kinghorn |

(Continued)

FOREIGN PATENT DOCUMENTS

DE  2636917  2/1978

(Continued)

OTHER PUBLICATIONS

Green Wall Panels Brochure, "Tired of the Concrete Jungle?" Eco Innovation, Inc., 2008.

*Primary Examiner*—Michael Mansen
*Assistant Examiner*—Monica Williams
(74) *Attorney, Agent, or Firm*—PCT Law Group, PLLC

(57) ABSTRACT

A green wall planting module has a rear wall, two side walls and a top and bottom wall, the top wall having a concave shape for receiving within its cross section a bottom wall of a green wall planting module mounted approximately one to four millimeters above it on a grid wall structure to suppress splashing and retain rain water. The grid wall structure comprises horizontal rods associated with a vertical wall structure of, for example, a building. The top wall of a lower mounted green wall module comprises an integral slot adapted to receive a horizontal irrigation pipe or hose which may lie horizontally in and longitudinally along the slot when the green wall modular apparatus is mounted to the grid wall. Tapered louvers are provided within the green wall planting module slanting upward from the rear wall at a predetermined angle within the module so as to collect and retain water as does the bottom concave wall of the apparatus. A controlled irrigation system including a cistern and rain barrel is provided to re-circulate collected rain water to plantings horizontally displayed by the green wall planting module.

20 Claims, 20 Drawing Sheets

U.S. PATENT DOCUMENTS

| | | |
|---|---|---|
| 5,373,662 A | 12/1994 | Wickstrom |
| 7,627,983 B1 | 12/2009 | Deutsch-Aboulmahassine |
| 2005/0100418 A1 | 5/2005 | Lee |
| 2007/0199241 A1 | 8/2007 | Peleszezak |
| 2008/0000153 A1 | 1/2008 | Sugiyama et al. |
| 2008/0110086 A1 | 5/2008 | Julia |
| 2008/0209805 A1 | 9/2008 | Daures et al. |
| 2008/0295402 A1 | 12/2008 | Bindschedler et al. |
| 2008/0302002 A1 | 12/2008 | Schmidt |
| 2008/0302009 A1 | 12/2008 | Frecon et al. |
| 2009/0007486 A1 | 1/2009 | Corradi |
| 2009/0223126 A1 | 9/2009 | Garner et al. |

FOREIGN PATENT DOCUMENTS

| | | |
|---|---|---|
| EP | 337085 A2 | 10/1989 |
| GB | 2239155 | 6/1991 |
| GB | 2430856 | 4/2007 |
| WO | WO8806400 | 9/1988 |
| WO | WO2008143525 | 11/2008 |

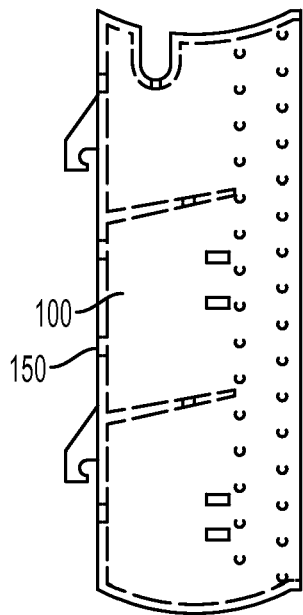
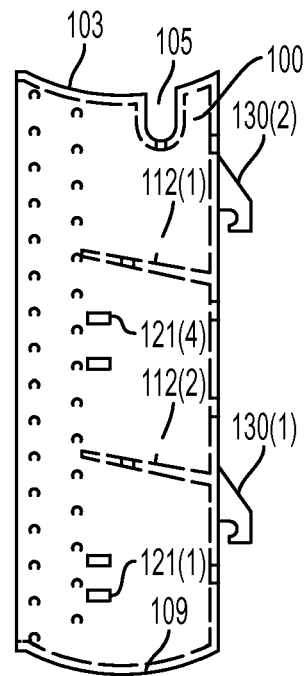
FIG. 1(E)    FIG. 1(F)
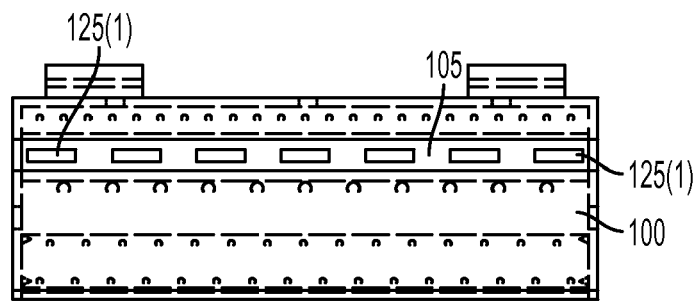
FIG. 1(G)
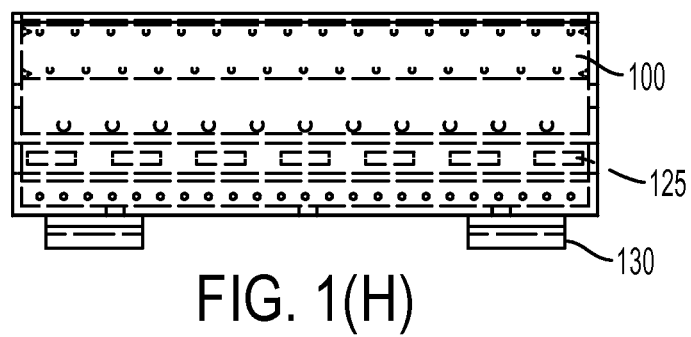
FIG. 1(H)

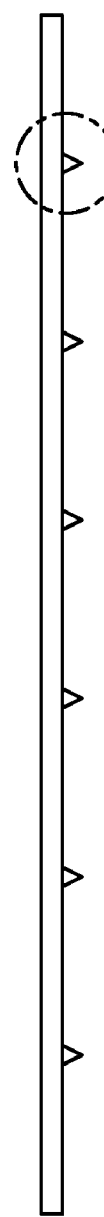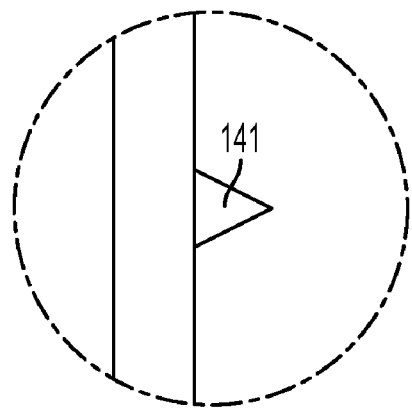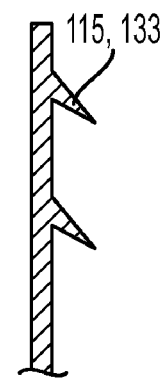
FIG. 4(A)-1
FIG. 4(A)-2
FIG. 4(B)

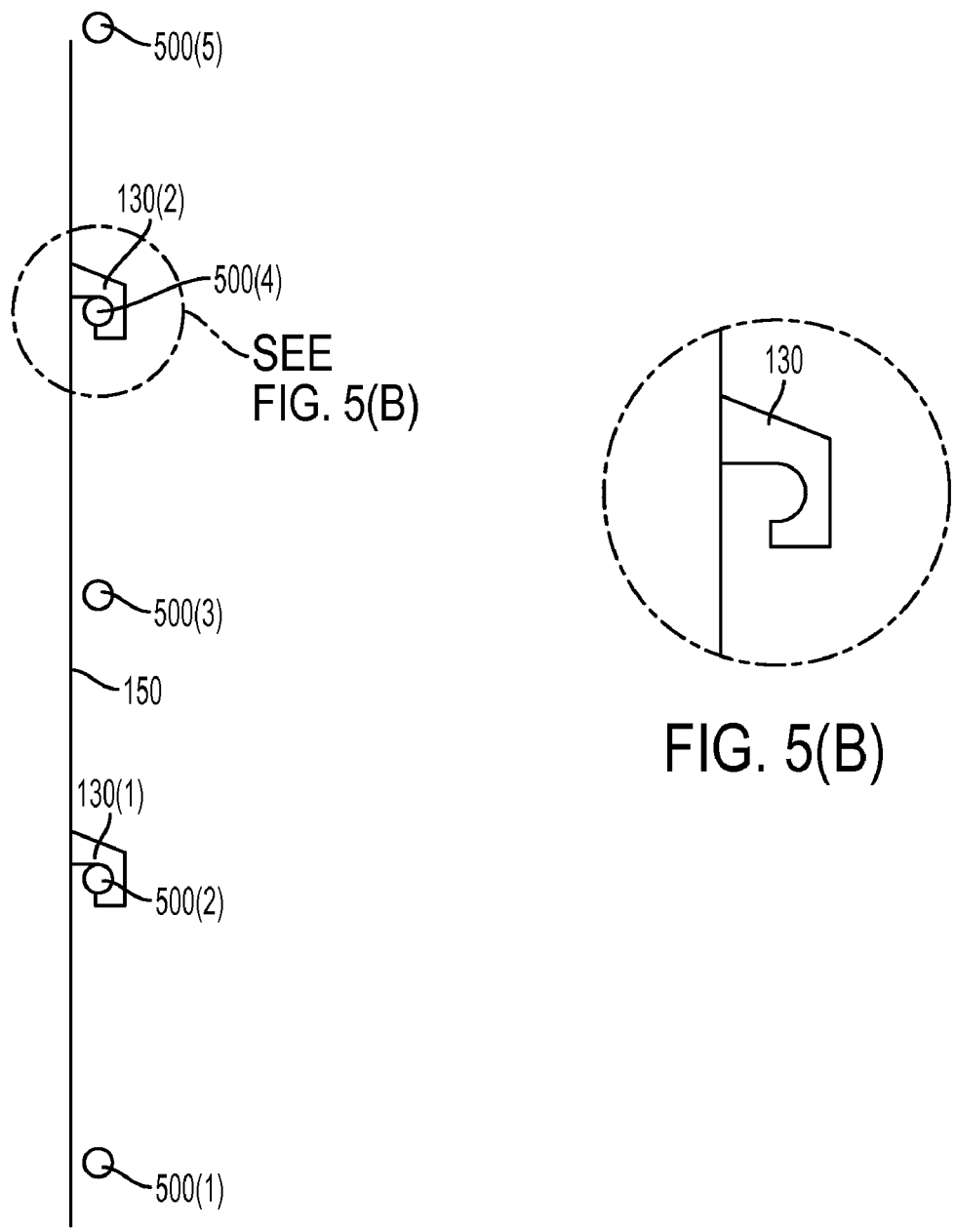

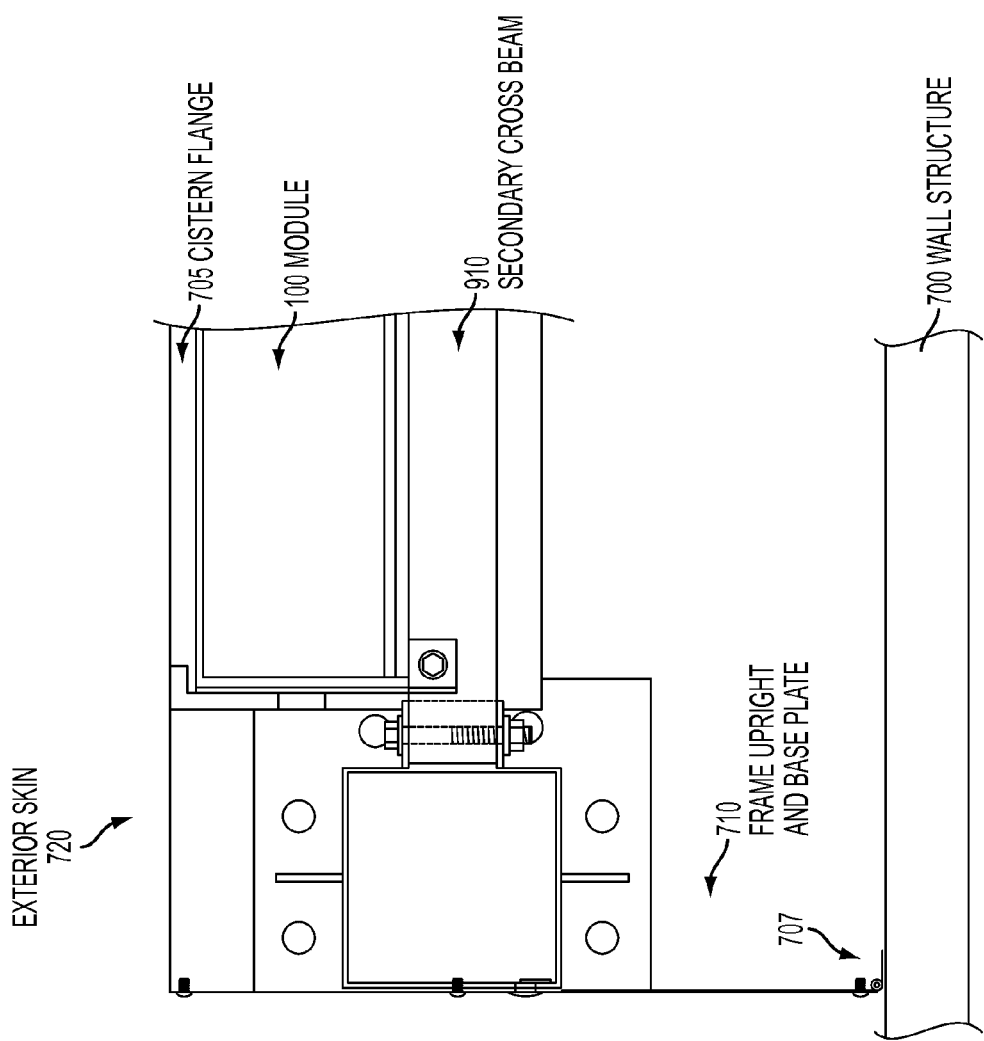

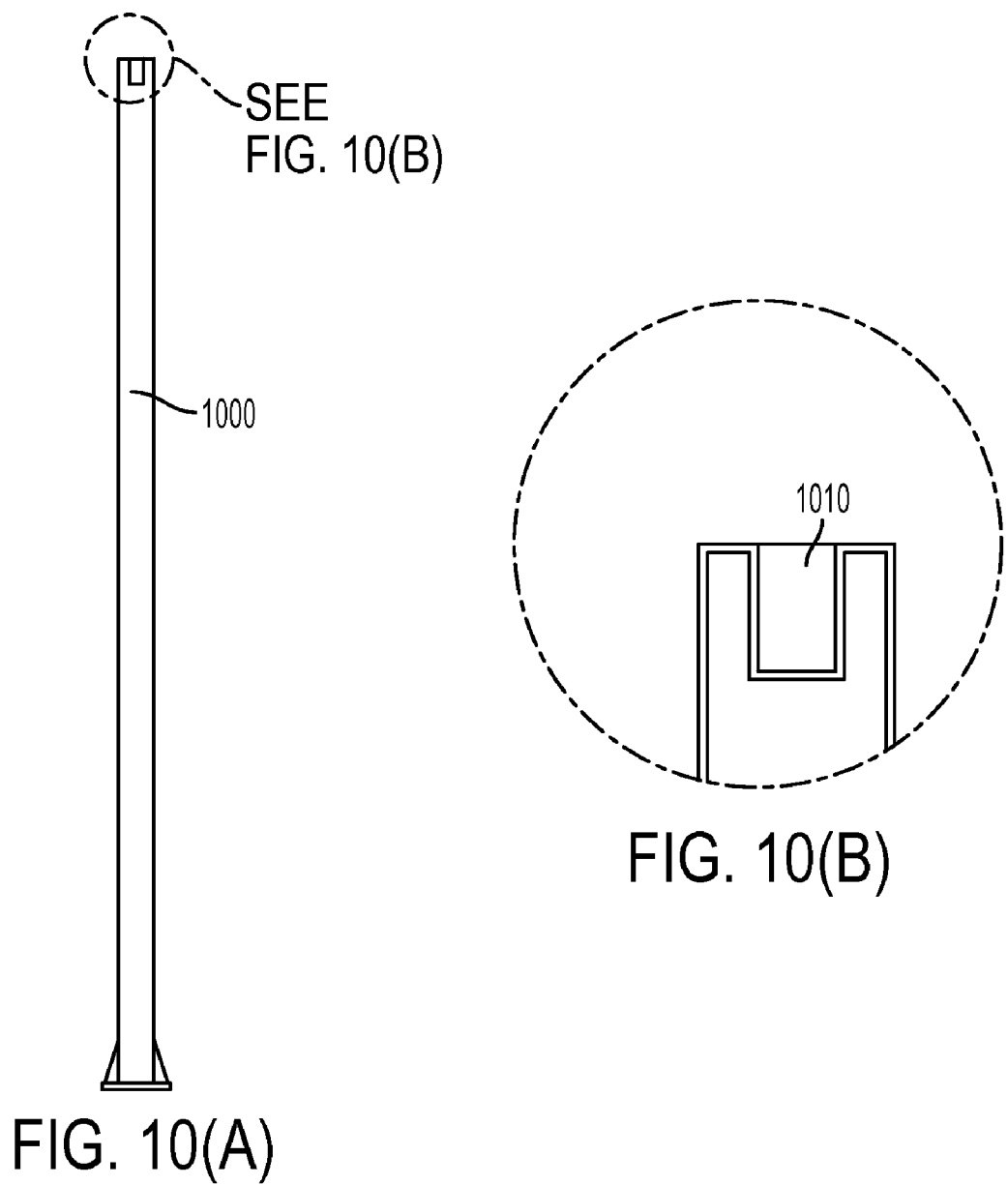

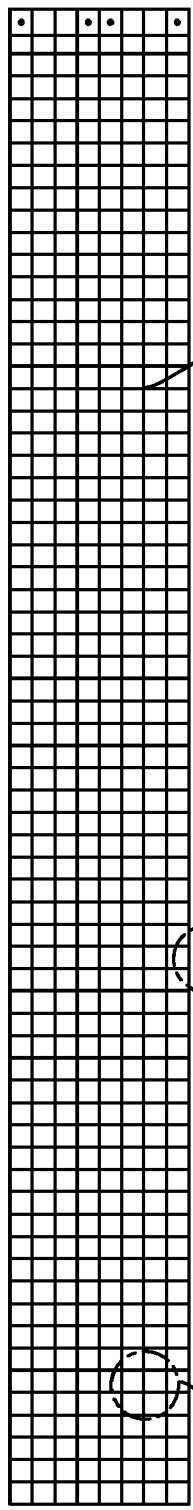
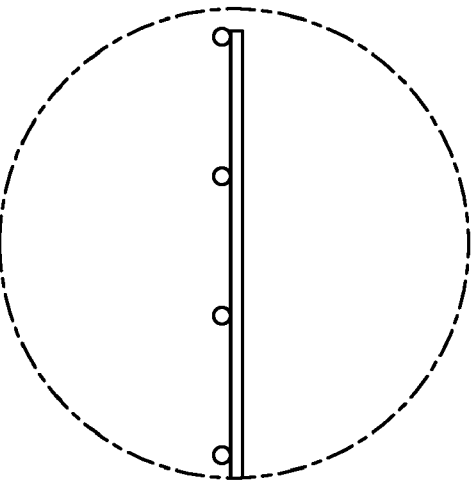
FIG. 15B
SEE FIG. 15(B)
SEE FIG. 15(C)
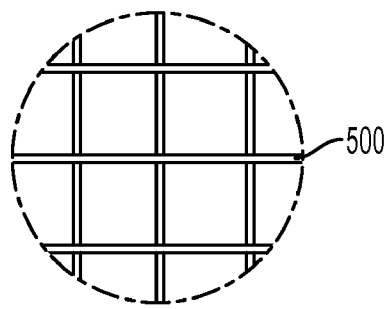
FIG. 15C
FIG. 15A

GREEN WALL PLANTING MODULE, SUPPORT STRUCTURE AND IRRIGATION CONTROL SYSTEM

This application claims priority to provisional U.S. application Ser. No. 61/253,341 filed Oct. 20, 2009, to U.S. application Ser. No. 12/612,155 filed Nov. 4, 2009, and is a continuation of U.S. patent application Ser. No. 12/624,084 filed Nov. 23, 2009, the entire disclosures of which are hereby incorporated by reference into the present application.

TECHNICAL FIELD

The technical field of the several embodiments of a green wall relates generally to the field of building a green wall structure for horizontally displaying planted plantings and, more particularly, to embodiments thereof wherein, for example, rain water is retained within green wall modules and is permitted to be fed by gravity from one module to the next lower module.

BACKGROUND

It is now more common to find plantings on the tops of buildings. Structures located on roofs of buildings which support such plantings have become known as green roofs. The green roof eliminates a typically flat, somewhat unattractive surface area and substitutes a garden of plantings for an empty roof. A green roof promotes oxygenation and the elimination of $CO_2$ emission. A green roof can provide food, if the plantings comprise vegetables (urban farming), or beauty, if the plantings comprise flowering plants. A problem with such structures as green roofs has become the fact that many roofs do not have the weight-bearing capacity to support the plantings, the structures in which the plantings are planted and an irrigation system to supplement, at times, a lack of rainfall. On the other hand, without such a green roof, storm water run-off is promoted. With storm-water run-off, rain water that collects on an empty roof is typically fed via gutters and downspouts or roof drains into a water waste system, rather than used for promoting healthy green vegetation. As the rain water flows from the roofs and onto pavement below, it may pick up hazardous wastes from such construction materials as tar and asphalt and the like or become overly acidic or basic and so become destructive to other plant and animal life rather than healthy.

An advantage of a green roof, besides its ability to promote clean oxygenated air, is its ability to help insulate the building on which it sits. For example, a green roof blocks ultra-violet radiation from the sun. Consequently, a green roof may save energy costs. On the other hand, a green roof is difficult to see from the ground. Thus, it is difficult for a building owner or tenant to advertise the fact that their building is "green." So even though the plantings may be formed into shapes that, for example, advertise the identity of the green promoter, the shapes can only be seen from the sky.

Gold, U.S. Patent Application Pub. No. 2007/0079547, published Apr. 12, 2007, provides an example of a green roof system. Containers for planting medium and plantings may be formed of recycled carpet. These containers may be formed of a base and plural walls. A water permeable root barrier may be positioned to block growth of plant roots into a drainage layer. A roof protective layer protects the roof comprising at least one sheet of water permeable fabric. A drainage mat may have a plurality of water capturing cups with water flow facilitated through gaps between the cups. Other forms of green roof are known as well.

While green roofs promote the environment, there remains a need for extending the concepts of green plantings to vertical structures such as walls of buildings. The planting of green walls and the design of associated structures originated outside the United States and has extended to the United States from abroad. Traditionally, climbing plants may be planted at the foot of a wall. However, such a planting as ivy can be very difficult to remove once planted and may do some damage to the wall surface. Alternatively, support structures such as arbors may be used for flowering plants such as roses and the like. However, these structures are limited by their weight bearing ability to support large plants and may tend to deteriorate over time.

Fukuzumi, U.S. Pat. No. 5,579,603, issued Dec. 3, 1996, discloses a plant growing method for greening wall surfaces whereby a plurality of stacked flexible bags are formed. The flexible bags include a plurality of compartments with openings communicating with the exterior for receiving plantings and plant soil medium. Soil is loaded through openings into bag compartments with the bags laid horizontally while the plantings are allowed to grow. The multi-compartment bag is then suspended along a vertical wall to be made "green." Water can be supplied into the compartments of the bag to promote the growth of the plantings. A problem with such a wall hanging bag is that the wall must support the weight of the bag, the soil and the plantings. Moreover, the bag may tear over time and the green wall deteriorate, for example, from the growth of plant root structure or the weather. Water running down the wall from rain may be used to moisten the backs of the bags and the plants contained therein. However, the plant root structure thus is encouraged to obtain water from the vicinity of the wall and grow through the bag fabric. The rain and root structure may help the bag fabric to deteriorate. Irrigation piping may be used to intentionally moisten the walls and bag system and drip down to the bags during a lack of rain.

U.S. Pat. No. 4,268,994, to Urai, issued May 26, 1981, describes a three-dimensional planter. The planter may incorporate liquid retention boards attached to the back wall of the planter. These may extend slantingly upward and accumulate water to prevent rapid transmission of water through planting growth material.

Peleszezak of France, U.S. Patent Application Pub. No. 2007/0199241, published Aug. 30, 2007, describes a structure for a vegetated wall of boxes. Buried within the thickness of the boxes in a planting substrate are a network of water pipes and drains. A vertical water pipe is connected with horizontal water pipes at a number of levels to irrigate the boxes. A photovoltaic panel and battery may supply electrical energy to run an irrigation pump and lighting.

Binschedler et al. of France, U.S. Patent Application Pub. No. 2008/0295402, published Dec. 4, 2008, disclose a modular greening device for facades, walls and the like comprising a support structure of at least two parallel vertical rails for receiving individual modules stacked above one another by means of dowels or pins received into respective sockets of the vertical rails. An individual modular greening device is equipped with ribs having perforations at a rear wall. The top and bottom walls of a module are likewise equipped with perforations at the bottom of lateral walls forming a V shape. Thus water collected in a V of a top module is conveyed through the perforations at the bottom of the V to the next structure below. There appear to be gaps between the bottom wall of an upper module and an upper wall of a bottom module per FIG. 4A. Such a structure may encourage splashing and loss of water rather than the water being efficiently provided by gravity feed to vegetation planted in the modules.

Moreover, special locking sections are required to maintain the modules in place and, potentially, prevent theft of the modules. A disclosed irrigation system comprises a gutter and a vertical and horizontal irrigation pipe system that is installed separately from the modules.

Garner et al., U.S. Patent Application Pub. No. 2009/0223126, published Sep. 10, 2009, discloses a vertical plant supporting system comprising a matrix of tubes. Growth media is added to a closed cavity defined by each tube in the matrix of tubes. A water supply is positioned along an upper surface of the matrix of tubes and connected to a supply of water that may contain additional plant nutrients.

Recently, a number of metropolitan cities have endorsed the Leadership in Energy and Environmental Design or LEED® standards for new construction of the U.S. Green Building Council. Examples include San Jose, Calif. on the west coast and Baltimore, Md. on the east coast. These standards encourage, as their name suggests, smart energy conservation and environmental design. Consequently, there is an opportunity for further research and development in the field of green structure design.

Each of the above-identified patents and patent applications should be deemed to be incorporated by reference herein as to their entire contents.

SUMMARY OF EMBODIMENTS AND ASPECTS

This summary is intended to introduce, in simplified form, a selection of concepts that are further described in the Detailed Description and depicted in the drawings. This summary is not intended to identify key or essential features of the claimed subject matter, nor is it intended to be used as an aid in determining the scope of claimed subject matter. Embodiments and aspects described herein relate generally to embodiments and aspects and methods of use of a support structure in the form of a grid wall and module(s) for permitting water retention after a rain fall of up to seventy-two hours. Each module integrates a slot for receiving a horizontal irrigation pipe of a controlled irrigation system into the design of a plant module of a green wall structure. The green wall structure is free-standing of the wall and has a weight supported by, for example, a stainless steel grid wall structure of vertical and horizontal members, for example, where the support frame is supported in porous concrete footings. The structure may comprise a rain catch at the top and a cistern at the bottom of the green wall. Plant growth media moisture sensors may sense the moisture content within, for example, the soil of individual module planting compartments, and the irrigation control system control the artificial supply of water to the planting modules. While a grid wall structure may support the planting modules such that they are facing a passer-by and are thus pleasant to view, the inside of the wall structure may support a rain barrel structure that is substantially thin, rectangular but capable of receiving storm-water run-off from a roof via the rain catch, building gutters, and the like for holding water that would otherwise become waste. The control system is supplemented by a rain water sensor for detecting rain fall amount and may be supplemented by water level sensors for the cistern and rain barrel to provide input to a controller as to whether an artificial water supply needs to be used or the water collected in the cistern may be pumped to the horizontal irrigation pipes. Moreover, nutrition, if needed, such as a fertilizer, may be added from a source at the output of the pump.

One embodiment comprises a modular apparatus for constructing a green wall. The modular apparatus may be adapted to display plantings substantially horizontally. The plantings are allowed to grow vertically in modules until the modules are ready to be installed on to a grid wall. When the modular apparatus is mounted to a vertical side wall of a fixed structure by way of a grid wall, the modular apparatus comprises, for example, one, two, three or more planting boxes, separated by one or more louvers for mounting to the wall of the fixed structure by means of the grid wall to which it attaches, building the green wall from the ground up. The planting boxes have received the plantings in planting material and are preferably held in place by, for example, geotextile fabric. The module, for example, with three planting boxes, has opposing first and second substantially flat side walls and a rear wall for mounting to the grid wall by mounting catches that link to horizontal bars of the grid wall. The modules thus require lifting to be removed from a horizontal rod of the grid wall.

A top wall of a module, with, for example, three planting boxes has a concave cross-section and a slot extending vertically downward, the slot disposed off-center of the concave cross-section and having an aperture at the bottom disposed toward the rear wall. The top wall of the planting module thus receives water in the slot via its concave cross-sectional shape for delivery to the plantings below. A bottom wall of a planting box has a convex cross-section. The bottom wall is adapted to be received within the concave cross-section of a top wall of an immediately adjacent, vertically lower modular apparatus for example, such that the concave wall fits closely to the convex wall at a distance of approximately one to five millimeters. In this manner, water being fed by gravity from one module to the next one below is prevented from splashing and, once a wall is constructed, the small distance between modules prevents theft of a lower planting box. Because the green wall is constructed from the ground up, one attempting to steal the lower-most module is precluded from doing so by the weight of the whole green wall and the catches requiring the module to be lifted to be removed but being stopped by the small distance between it and the planting module above. When mounted to a vertical wall of a building, the green wall structure provides noise abatement, energy conservation and helps to mitigate storm water run-off.

The bottom wall of convex cross-section of a module is further adapted to collect water on a top convex surface and is provided with an aperture disposed off-center of the convex cross-section toward the rear wall of the module. Consequently, the bottom wall of a module, having, for example, three planting boxes, collects and retains water received at its top convex surface. The off-center, toward the rear wall, aperture permits water to be received at the top wall of one of an immediately lower modular apparatus of the green wall and a cistern.

Each green wall module has at least one louver disposed between the top wall and the bottom wall for fixed connection to side walls and the rear wall at a predetermined upward angle. For example, one louver may cut the module into two planting boxes. The louver is equipped with an aperture disposed in the louver opposite the rear wall toward its front edge. The louver, thus, may collect and retain water received at a top surface and deliver the water by gravity flow through the aperture to plantings planted below in the next below planting box.

A feature of the lower concave wall of the module is an integral slot for receiving an irrigation pipe which may be used in periods of a lack of rain to artificially provide water to the planting boxes by gravitational flow. Again, the flow of water may be regulated by a control system further including solenoid valves whereby a specially programmed computer processor can consider the indicated needs of individual planting boxes for water via moisture sensors in the planting boxes, cistern water level sensors, rain barrel sensors, rain water sensors, temperature and humidity sensors and control of an exterior water source used only when necessary.

In addition to the retaining, for example, of geotextile fabric in place for retaining planting material, the planting growth medium for receiving the plants may preferably comprise coconut fiber and/or a multi-layer material made of recycled fabric. The planting boxes or modules may be provided with barbs of straight or inwardly pointed shape, for example, in parallel rows lining the inside of a planting box or module. Moreover, an optical fiber system may be used to feed light through a plurality of, for example, circular channels or apertures in the rear wall of a module. When flowering plants are not blooming or for other decorative or even advertising purposes, the circular channels or apertures may be used to provide a decorative display of light under processor control.

These and other embodiments and aspects will now be described with reference to the drawings and the detailed description to follow.

BRIEF DESCRIPTION OF THE DRAWINGS

FIG. 1 shows an embodiment of a green wall module 100 having two louvers 112 and three planting boxes or compartments wherein FIG. 1(E) is a left side view and FIG. 1(F) is a right side view. FIG. 1(G) is a top view where a vertical grid wall to which it attaches would be located at the top, and FIG. 1(H) is a top view where a vertical grid wall to which it attaches would be located at the bottom.

FIG. 4 shows details of retaining barb arrangements for retaining, for example, geotextile fabric and planting material wherein FIG. 4(A) provides details of interior retaining barbs 141, and FIG. 4(B) provides details of module cover retaining barbs 115, 133.

FIG. 5 provides module 100 mount details for mounting to horizontal rods 500 of a grid wall seen in FIG. 15 via catches 130 fixedly attached to rear wall 150 of a module 100; the catches 130 require that a module 100 be lifted from a horizontal rod of a grid wall in order to be removed therefrom.

FIG. 9A provides a third top down view of support frame structure and secondary cross beam and skin attachment connections whereby a wall structure 700 is connected by a continuous hinge 707 to a frame upright and base plate 710 and also showing a cistern flange below a module 100, a secondary cross beam 910 and exterior skin 720; no rain barrel is shown in the cavity between the wall structure 700 and the grid wall.

FIG. 10(A) provides details of a frame upright 1000 and FIG. 10(B) provides details of upright 1000 including an interlocking socket 1010.

FIG. 15 provides details of a grid wall 1500 for supporting a plurality of modules 100 and rain barrel compartments 920 via horizontal members 500.

DETAILED DESCRIPTION OF THE EMBODIMENTS

Figure 7:
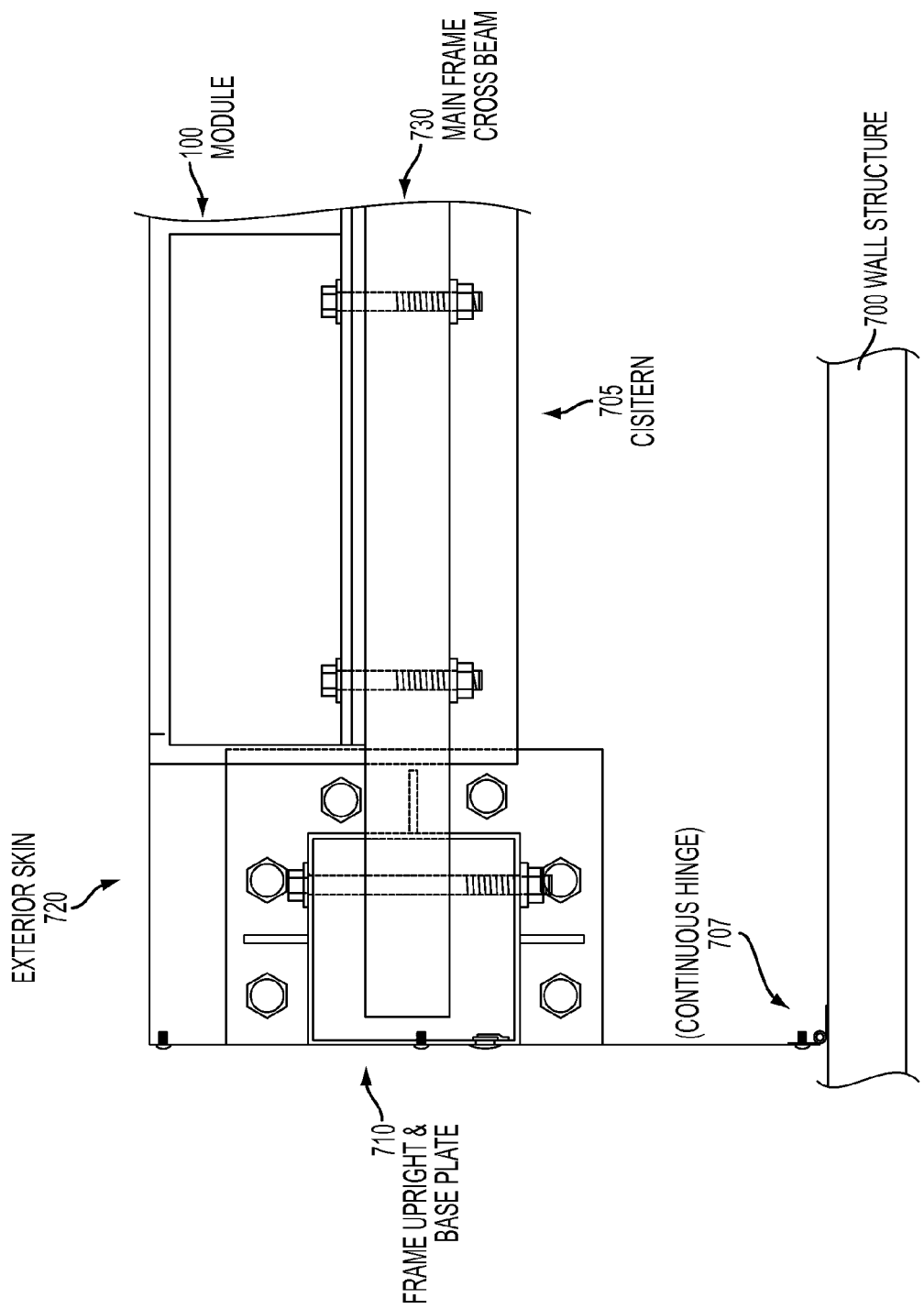
FIG. 7 provides a first top down view of support frame structure and main frame connections whereby, for example, a building vertical wall structure 700 is connected by a continuous hinge 707 to an access panel to a frame upright and base plate 710 and also showing a main frame cross beam 730, a cistern 705 below a module 100 and exterior skin 720; no rain barrel is shown in the cavity between the wall structure 700 and the grid wall.

The figures generally provide details of a green wall structure for receiving plantings for beautifying a typically vertical wall of a structure, for example, wall structure 700 of FIG. 7. The green wall structure, seen, for example, in FIGS. 12-14 may be designed to surround elements of the vertical wall of a typical building such as doors and windows or to create an ornamental or advertising appearance.

Figure 9B:
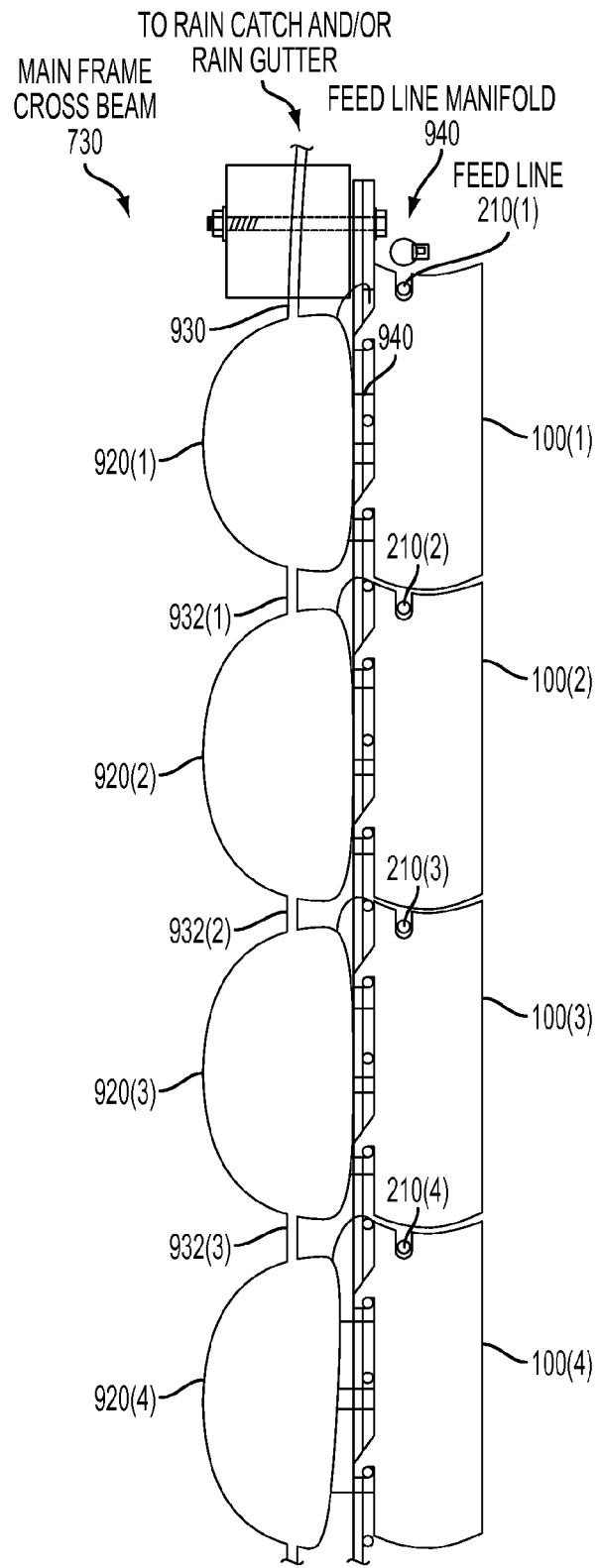
FIG. 9B shows a plurality of modules 100(1) to 100(4) mounted to a grid wall further supporting on its opposite side a plurality of associated rain barrel bag compartments 920 for receiving rain from a rain catch or rain gutter; feed lines 210(1) to 210(4) of each module 100 capillaries 940 which may feed water to each module 100 and tubes 930 from a gutter or rain catch and tubes 932 between compartments 920. A wall structure 700 is not shown in FIG. 9(B) but would be vertically located on the left side.
Figures 1, 11A:
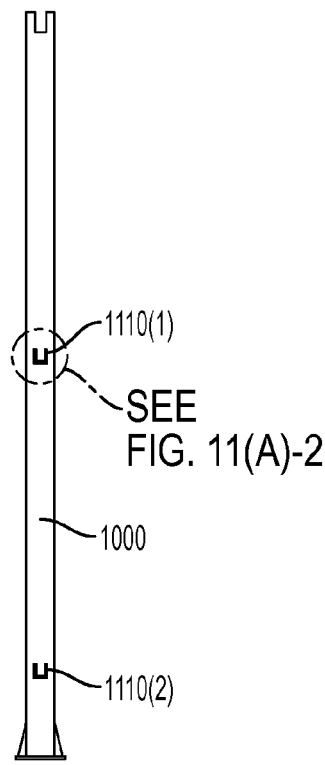
Figures 1, 11B:
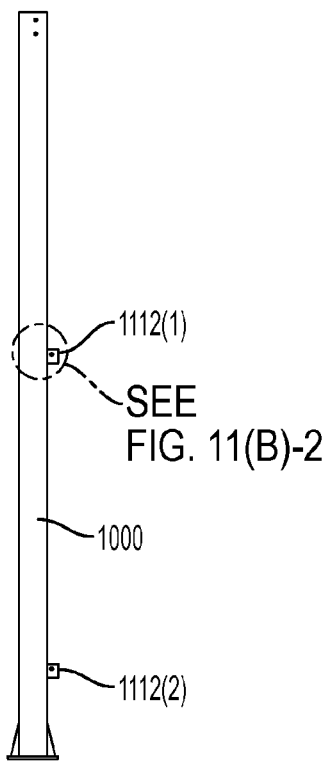
Figure 11C:
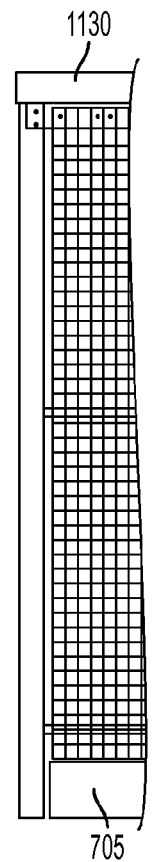
FIG. 11 provides further details of a frame upright 1000 including "u" connectors and circular connectors for horizontal rods and members for forming a grid wall where FIG. 11(A) provides detail of "u" support 1110.
FIG. 11(B) provides detail of circular support 1112 and FIG. 11(C) provides detail of a grid wall including a rain catch 1130 and a cistern 705.
Figures 2, 11A:
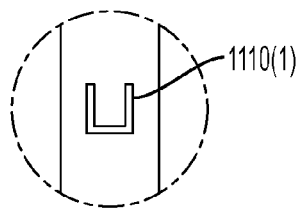
Figures 2, 11B:
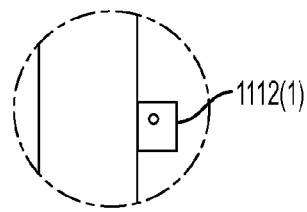

FIG. 1 shows an embodiment of a green wall module 100 having, for example, three planting boxes, separated by louvers 112 in several views. The module 100 is preferably constructed of recycled plastic which is strong, durable and long-lasting. For example, a post-consumer recycled plastic available from FPI Topcraft of Warminster, Pa. has a twenty year life and is itself recyclable at the end of its life. The module 100 may, for example, be manufactured by injection molding. Once fabricated, the green wall module 100 with one, two, three or more planting boxes (three shown) is typically laid on a ground such that its rear wall 150 is on the ground. An open side opposite rear wall 150 receives planting growth material such as a multilayer material made of recycled fabric and/or coconut fiber material along with, for example, geotextile fabric on top to help keep the plant growing medium in planting boxes once the module is planted and mounted to a vertical grid wall structure associated with a wall structure 700. Alternatively, the planting medium may be common top soil or other known planting growth medium. Moreover, as the planting boxes of the modules 100 are filled with planting medium and covered with, for example, geotextile fabric, barbs 115, 133, 141 on the internal top and side walls of the module 100 may retain the planting growth media and, for example, geotextile fabric covering the planting growth media. Sockets may be provided in the planting material and the fabric cut for receiving planting plugs of plants in the module 100 that may be blooming plants, vegetables or other plants, for example, that may be evergreen and hardy. Referring briefly to FIG. 9(B), once the planting boxes are established, the modules 100 with planting boxes planted may be mounted beginning from the bottom of a wall structure 700 upward on a grid wall structure (FIG. 15). Inside the grid wall structure may be mounted a rain barrel 920, 1670 of suitable material such as plastic or strong, flexible bag material so that, as the rain barrel fills from water run-off from gutters or the roof, the rain barrel may fill the cavity between the structure wall 700 and the grid wall (FIG. 15). Catches 130 mount on rods of the grid wall and require that the modules be lifted up from the supporting horizontal rods 500 of the grid wall to be removed. (The grid wall structure will be described with respect to FIGS. 14 and 15).

An irrigation system to be described further with reference to FIGS. 9(B) and 16 may be integrally built into the planting boxes and controlled as will be discussed with reference to, for example, integral horizontally laid irrigation pipes 210 (seen in FIG. 2) lying in slots 105 of top wall 103. A cistern 705 of the irrigation system may be filled via a rain barrel 920, 1670 mounted between the grid wall and wall structure 700. The whole irrigation system and a lighting system is controlled by a typical programmed processor 1600 as will be described in conjunction with FIG. 16.

Figure 1A:
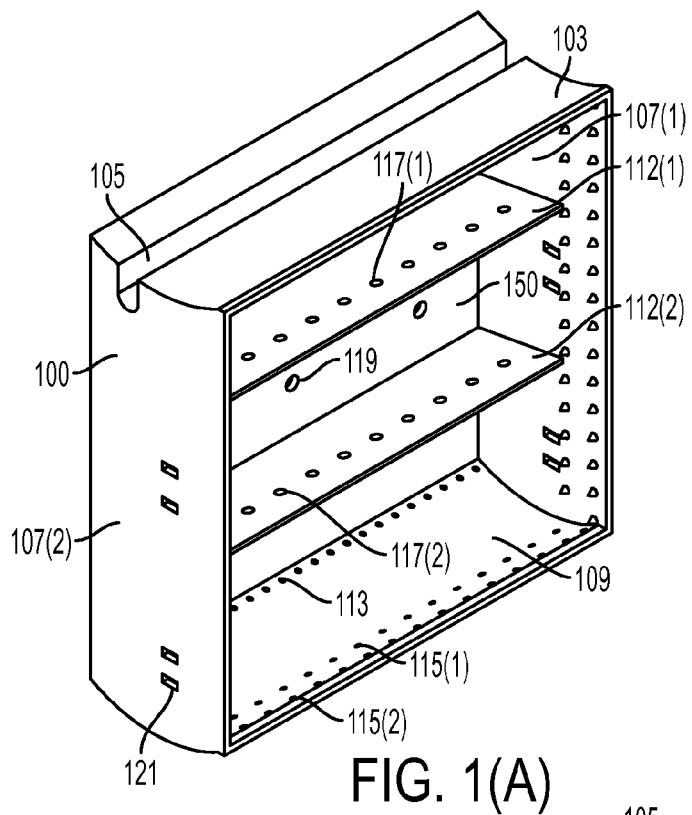
FIG. 1(A) is a left side perspective frontal view and FIG. 1(B) is a right side perspective frontal view from the top.
Figure 1B:
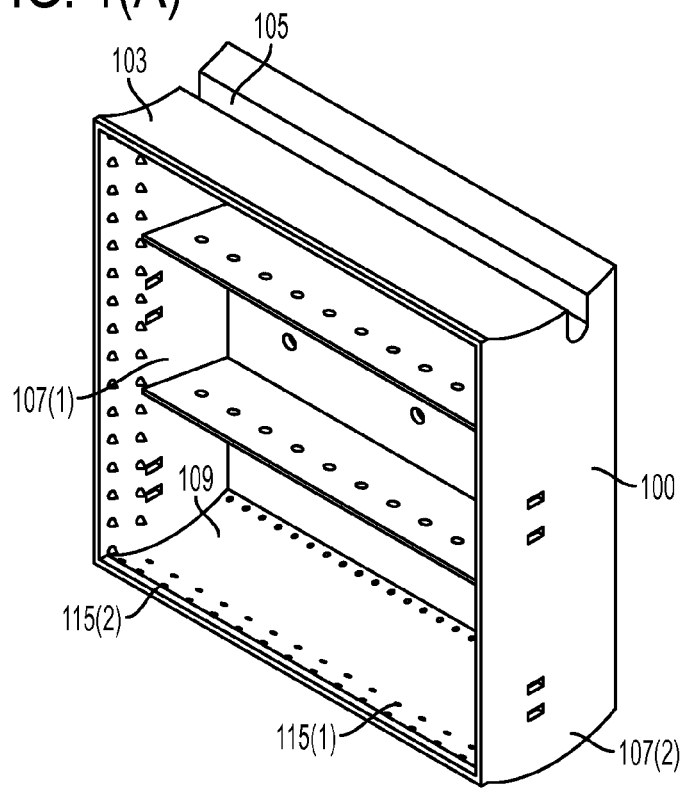

FIG. 1(A) is a left side perspective frontal view of a module 100 with three planting boxes, and FIG. 1(B) is a right side perspective frontal view from the top. A top surface 103 of the module 100 may be concave and have an integral slot 105 for longitudinally receiving an irrigating pipe (pipe 210 of FIG. 2). Side walls 107(1) and 107(2) are provided with zip slits 121 for connecting modules 100 with zip ties together and for providing communication, as necessary between modules 100.

A feature of green wall module 100 is its design to retain, for example, rain water for a period of approximately seventy-two hours. Louvers 112(1) and 112(2) are slanted upward and fixedly connected to rear wall 150. Each louver may collect and retain water received from above by gravitational flow through the planting medium. Apertures 117 are provided opposite rear wall 150 on louver 112 to permit water to drip from louver 112 to planting growth material below when the louver 112 reaches capacity. Moreover, the edge of louver 112 is designed to be within the planting medium so that water may also gravitationally flow off the edge to the planting medium below when the louver 112 is full. The louver 112 may be tapered in thickness from the rear wall 150 and a sharp edge.

Moreover, bottom wall 109 is convex and collects and retains water in its trough. Bottom wall 109 may be suitably shaped to correspond to top wall 103, for example, bottom wall 109 may have a circular arc cross section or that of a V shape or U shape. In an alternative embodiment, V shaped sides may have a flat horizontally planar floor and thus have a three sided slant sided U construction. Bottom wall 109 is provided with a row of apertures 113 near rear wall 150 so that water may pass through the apertures 113 and be received by a concave upper wall 103 of the next lower module 100. The distance between an upper module 100 and one immediately lower from it is intentionally maintained to be, for example, between 1 and 5 millimeters to prevent splashing and consequent loss of water and to prevent one from stealing a module low to the ground. The modules 100 are mounted to a grid wall per FIG. 15 by horizontal rods 500 through catches 130 so spaced as to create this distance between modules from the ground up. The catches 130 require a module 100 to be lifted to be removed. One attempting to lift a lower module 100 will not be able to lift it beyond this distance and so the minimal distance between modules stacked above one another prevents both water splash and theft.

Figure 1C:
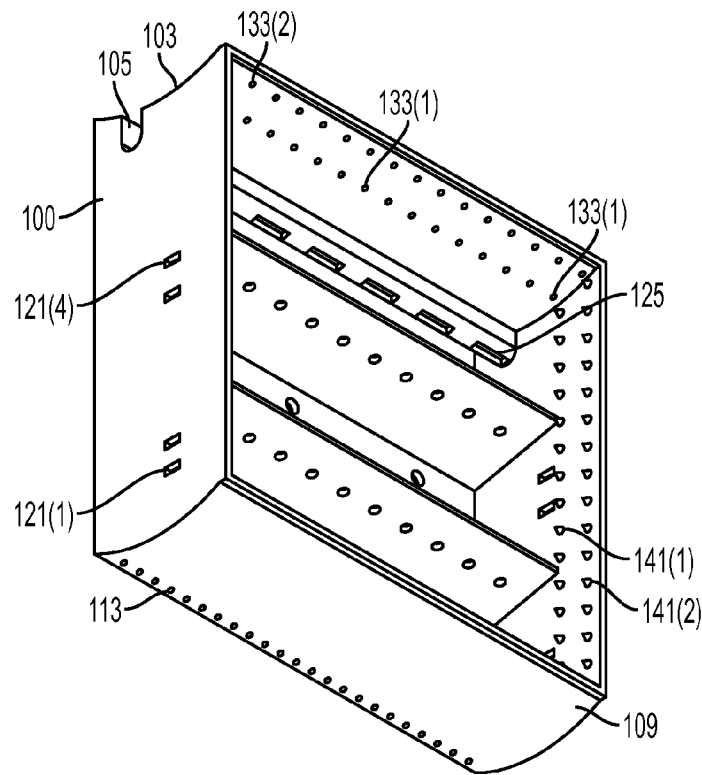
FIG. 1(C) is left side perspective view and FIG. 1(D) is a right side perspective frontal view from the bottom.
Figure 1D:
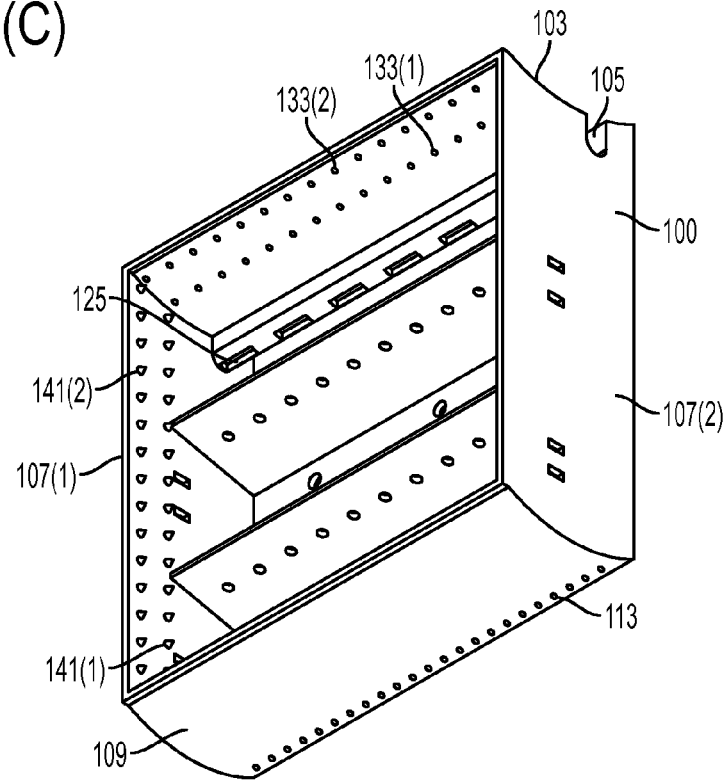

FIG. 1(C) is a left side perspective view and FIG. 1(D) is a right side perspective frontal view from the bottom. Slits 125 may be seen at the bottom of slot 105 proximate to rear wall 150 for permitting water to drip from the top wall 103 into planting growth material below. Parallel rows of barbs 133 may also be seen in a lower surface of the front of top wall 103, again, to prevent loss of planting growth material and help to restrain planting fabric from movement.

FIG. 1(E) is a left side view and FIG. 1(F) is a right side view. In these views may be seen the slanting character of louvers 112 at a predetermined angle upward to retain water. The side views also show parallel rows of barbs for retaining planting material and fabric. Also, zip slits 121 may be seen for zip tying modules 100 together horizontally and for horizontal communication between modules 100.

FIG. 1(G) is a top view where a vertical grid wall to which it attaches would be located at the top in a plane orthogonal to the drawing sheet and FIG. 1(H) is a top view where a vertical grid wall to which it attaches would be located at the bottom in a plane orthogonal to the drawing sheet. Catches 130 may be seen spaced apart on the rear wall 150. Slits 125 may be seen within slot 105 of module 100 for allowing water to pass through.

Figure 1I:
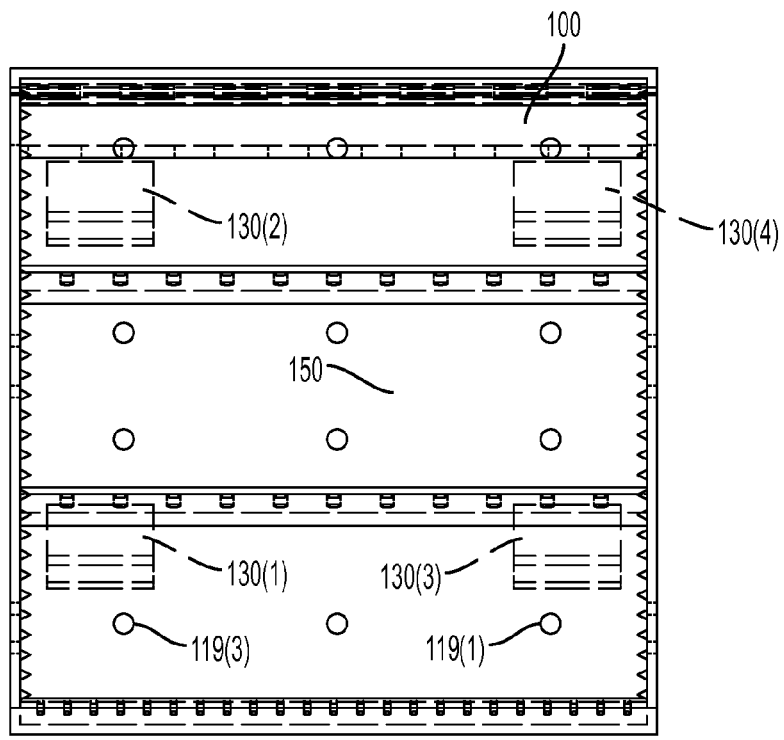
FIG. 1(I) and FIG. 1(J) are front views of green wall module 100 showing catches 130 in phantom and rear wall 150 to which the catches 130 are fixed.
Figure 1J:
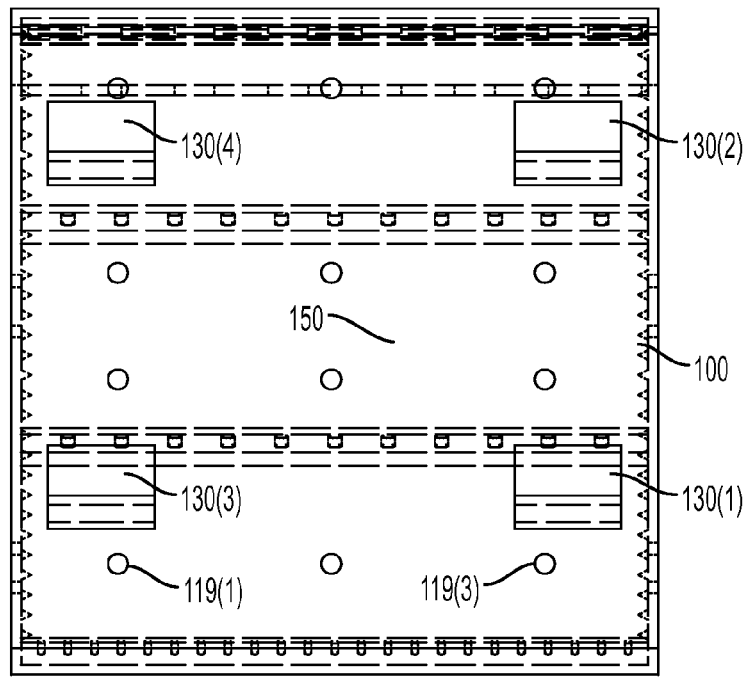

FIG. 1(I) and FIG. 1(J) are front views of green wall module 100 showing catches 130 in phantom and rear wall 150. Four catches 130 are shown spaced at predetermined spacing to snap down to horizontal rods 500 of a grid wall 1500 (FIG. 15). On rear wall 150 of module 100 are provided a matrix pattern of apertures 119, for example, twelve altogether, three in the top planting box, six in the second and three in the bottom planting box of module 100. These may allow light-providing optical fibers to pass through the planting material, through the fabric and through the plantings so that they may be seen by those viewing the green wall. The fibers may be arranged to create the appearance of flowers during periods when flowers are not blooming. The fibers (not shown) may also provide advertising being formed into letters, trade names or logos. The apertures 119 may also provide air for aerating the planting medium or connection for other utility such as electrical connection or for communication to an audio speaker. It must be appreciated that throughout all of FIGS. 1-16, similar reference numerals herein are used to denote similar elements in the figures where the first numeral of the reference numeral indicates the figure in which the element first appears. For example, module 100 first appears in FIG. 1 while horizontal irrigation pipe/hose 210 is first seen in FIG. 2.

Figure 2:
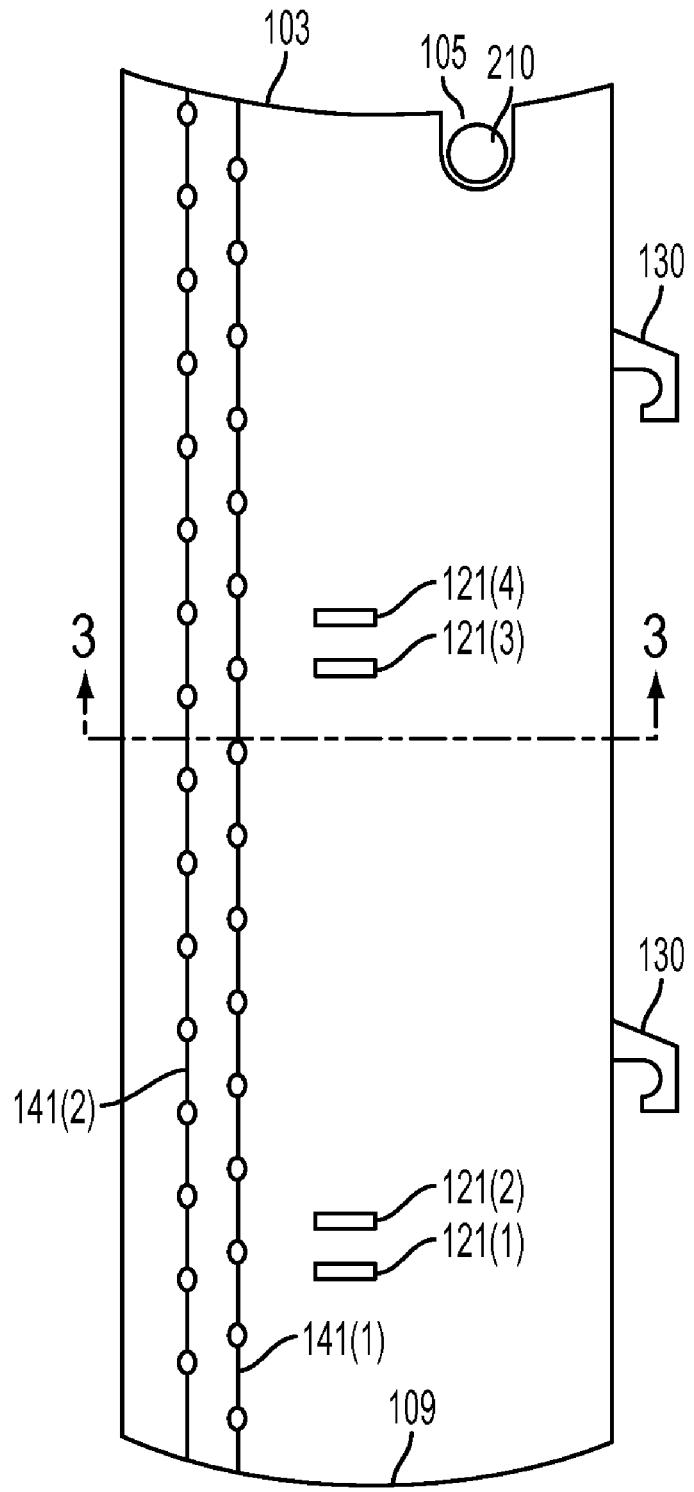
FIG. 2 provides a detail view of the green wall module 100 seen in FIG. 1(F) wherein the upper wall 103 and integral irrigation slot 105 may be seen in greater detail with a longitudinally running irrigation pipe, zip slits 121, barb lines 141, grid wall catches 130 and convex lower wall 109.

FIG. 2 provides a detail view of the green wall module 100 seen in FIG. 1(F) wherein the upper wall 103 and integral irrigation slot 105 may be seen in greater detail with a longitudinally running irrigation pipe, line or hose 210, zip slits 121, barb lines 141, grid wall catches 130 and convex lower wall 109, as well as possible dimensions for the green wall module 100. Irrigation pipe, line or hose 210 may provide water from an external source of water under control of an irrigation system per FIG. 16 or by pumping water from a cistern 705 per FIG. 7, fed by a rain barrel behind the grid wall of FIG. 15. Irrigation pipe, line or hose 210 may be provided with apertures for releasing pumped water, for example, on its lower surface which correspond to slits 125 of slot 105.

Figure 3:
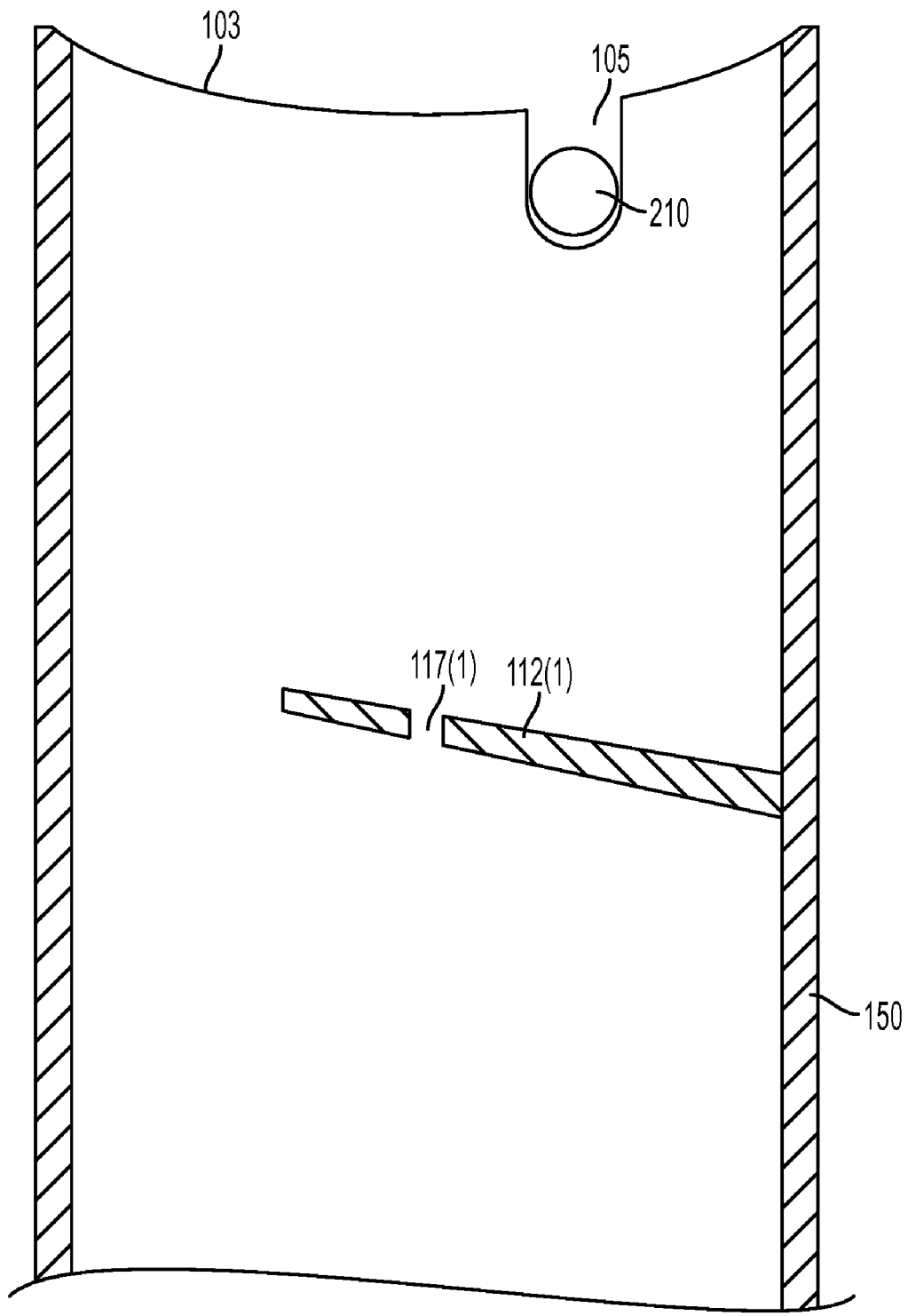
FIG. 3 shows a detail view of the green wall module 100 seen in FIG. 1(F) in internal cross-section whereby louver 112(1) may be seen in detail comprising an aperture 117(1) whereby the aperture is opposite rear wall 150 so that tapered louver 112(1) is at a predetermined upward angle and so may retain and hold water; moreover, details are shown of module top concave wall 103 and to louver 112(1); integral irrigation slot 105 and a horizontal irrigation pipe 210 for slot 105 are also shown.

FIG. 3 shows a detail view of the green wall module 100 seen in FIG. 1(F) in internal cross-section whereby louver 112(1) may be seen in detail comprising an aperture 117(1) whereby the aperture 117(1) is opposite rear wall 150 so that louver 112 is at a predetermined upward angle, for example, between five and twenty degrees and so may retain and hold water. Moreover, details and dimensions are shown of module top concave wall 103, integral irrigation slot 105 and a horizontal irrigation pipe 210 for slot 105. The length of louver 112 is sufficiently short that, if it fills to capacity with water, water may roll off the edge and gravitationally flow into planting growth material in addition to be fed through a lengthwise row of apertures 117 in louver 112. The louver 112 may be intentionally tapered from, for example, 0.25" in thickness at rear wall 150 to a point at its opposite sharp edge. As shown in the drawing, the edge has a cross-section of 1/8" or less. Planting growth material introduced into planting boxes of module 100 may be somewhat rigid, and a sharp edge of tapered louver 112 may help to cut through the planting growth material.

FIG. 4 shows details of retaining barb arrangements for retaining planting fabric and planting material wherein FIG. 4(A) provides details of interior retaining barbs 141 which are straight, and FIG. 4(B) provides details of module cover retaining barbs 115, 133 which may be pointed in to better grab material. From FIG. 1, it may be seen that retaining barbs may be provided in parallel rows 141 to better grasp planting fabric and planting growth material.

FIG. 5 provides module 100 mount details for mounting to horizontal rods 500 of a grid wall seen in FIG. 15 via catches 130 fixedly attached to rear wall 150 of a module 100 where the rods are approximately three inches apart and module 100 is approximately twelve inches by 12 inches. Dimensions as used herein are representative only and may be lesser or greater depending, for example on the application. For example, four catches 130, about six inches apart, are designed to require that a module 100 be lifted from first and second horizontal rods 500 of a grid wall (FIG. 15) in order to be removed therefrom.

Figure 6A:
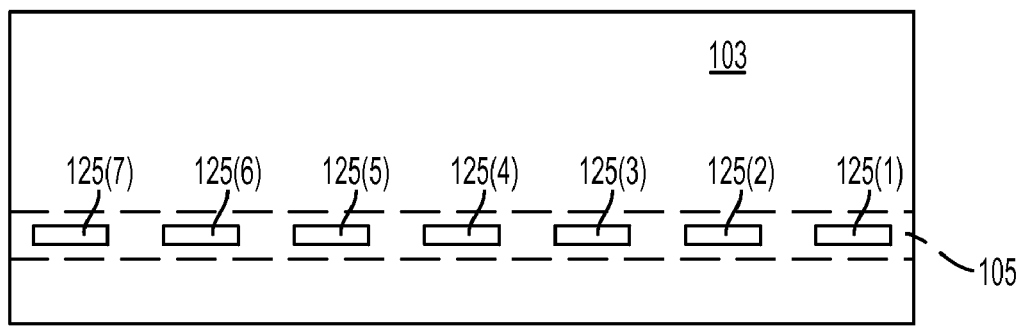
FIG. 6 provides details from a top down view FIG. 6(A) of the top wall 103 of module 100 having irrigation slot 105 and slits 125 in the slot 105 and a top down view FIG. 6(B) of the bottom wall 109 with apertures 113, for allowing water to drip by gravitational flow, proximate to rear wall 150 of module 100.
Figure 6B:
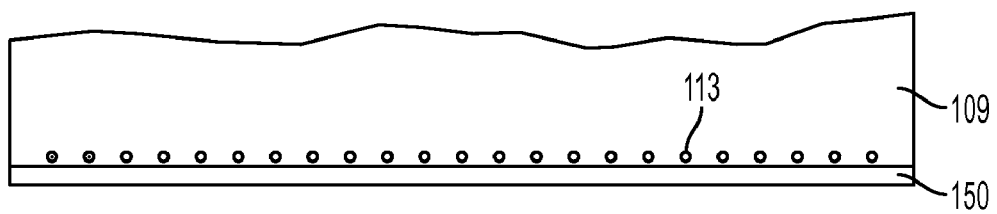

FIG. 6 provides details from a top down view of a module 100. FIG. 6(A) provides details of the top wall 103 having irrigation slot 105 and, for example, seven slits 125 in the slot 105. FIG. 6(B) is a top down view of the bottom wall 109 with apertures 113 for allowing water to drip by gravitational flow proximate to rear wall 150 of module 100. Bottom wall 109 collects water practically up to the edge of the convex surface and has, for example, a circular arc cross-section.

Figure 12:
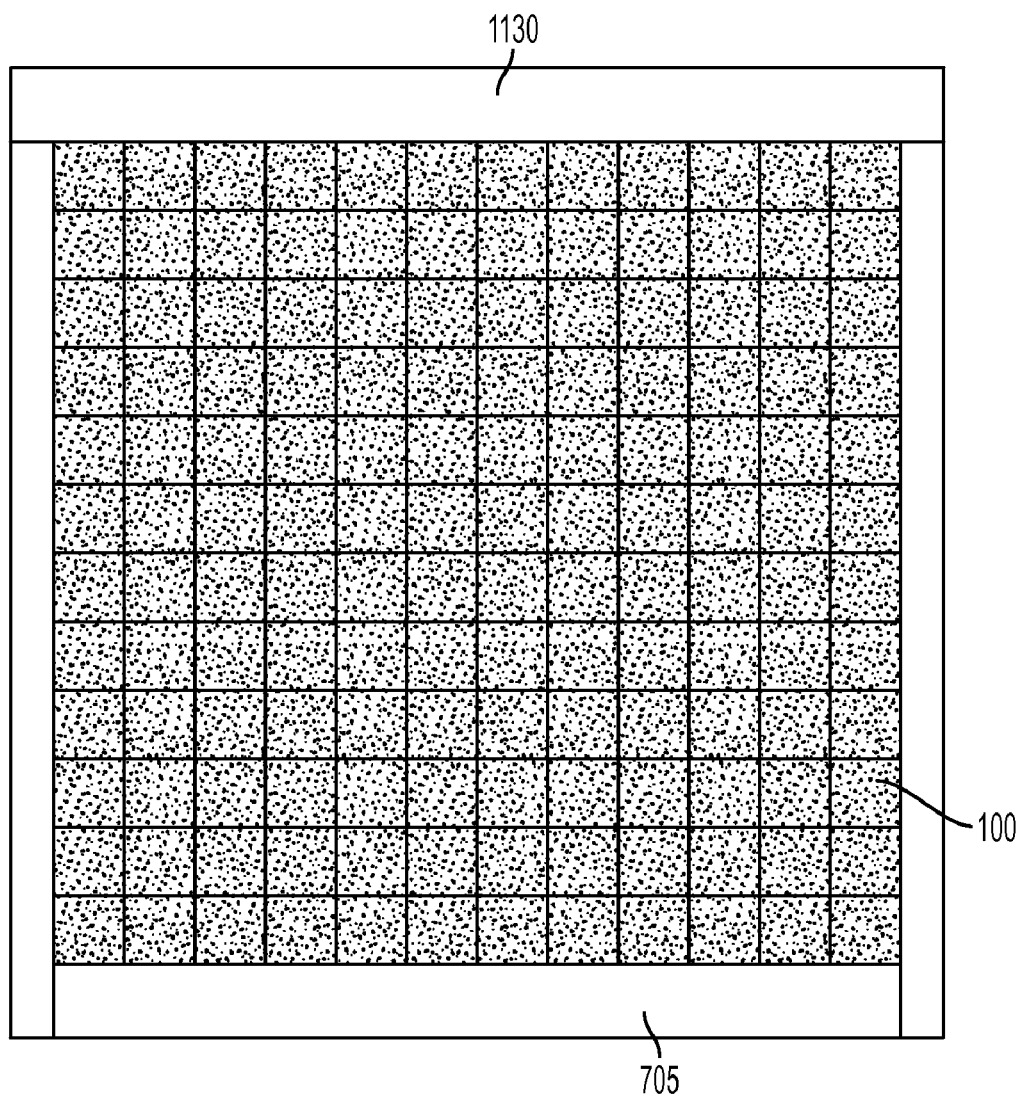
FIG. 12 provides a front view of a typical green wall including plantings within modules 100 where cistern 705 and rain catch 1130 are shown.

FIG. 7 provides a first top down view of support frame structure and main frame connections. Assume that wall structure 700 is approximately vertical. A building vertical wall structure 700 is connected by a continuous hinge 707 to a frame upright and base plate 710. For example, for maintenance purposes, access panel is hinged and accessed via an access panel lock shown in parenthesis. Frame upright and base plate 710 is also seen and FIG. 7 further shows a cistern 705 below a module 100. An exterior skin 720 may be provided for the support frame. In the empty space between the wall structure 700 and the grid wall and main frame cross beam 730, there may be provided a rigid rain barrel structure 920, 1670 (FIGS. 9(B) and 16)) of recycled plastic shaped like the grid wall, for example, about 12 foot by 12 foot by one to six inch width. Alternatively, for example, a flexible rain barrel 920 may be provided of flexible material in the form of a bag or series of inter-connected bags that may hang from horizontal rods 500 of the grid wall 1500, for example, at locations proximate to vertical frame uprights 100 to collect water and support its weight. As will be described with reference to FIGS. 9(B) and 16, a rigid or flexible rain barrel 920, 1670 mounted to the opposite side of a vertical grid wall of a planted grid wall as seen in FIG. 12 may be fed water by gutters or drains of a slanted roof or other roof structure such as gutters for solar panels and the like. The rigid or flexible rain barrel may feed cistern 705 and the cistern 705 provide recycled clean water to plants of the green wall modules of FIG. 12 under computer program control.

Figure 8:
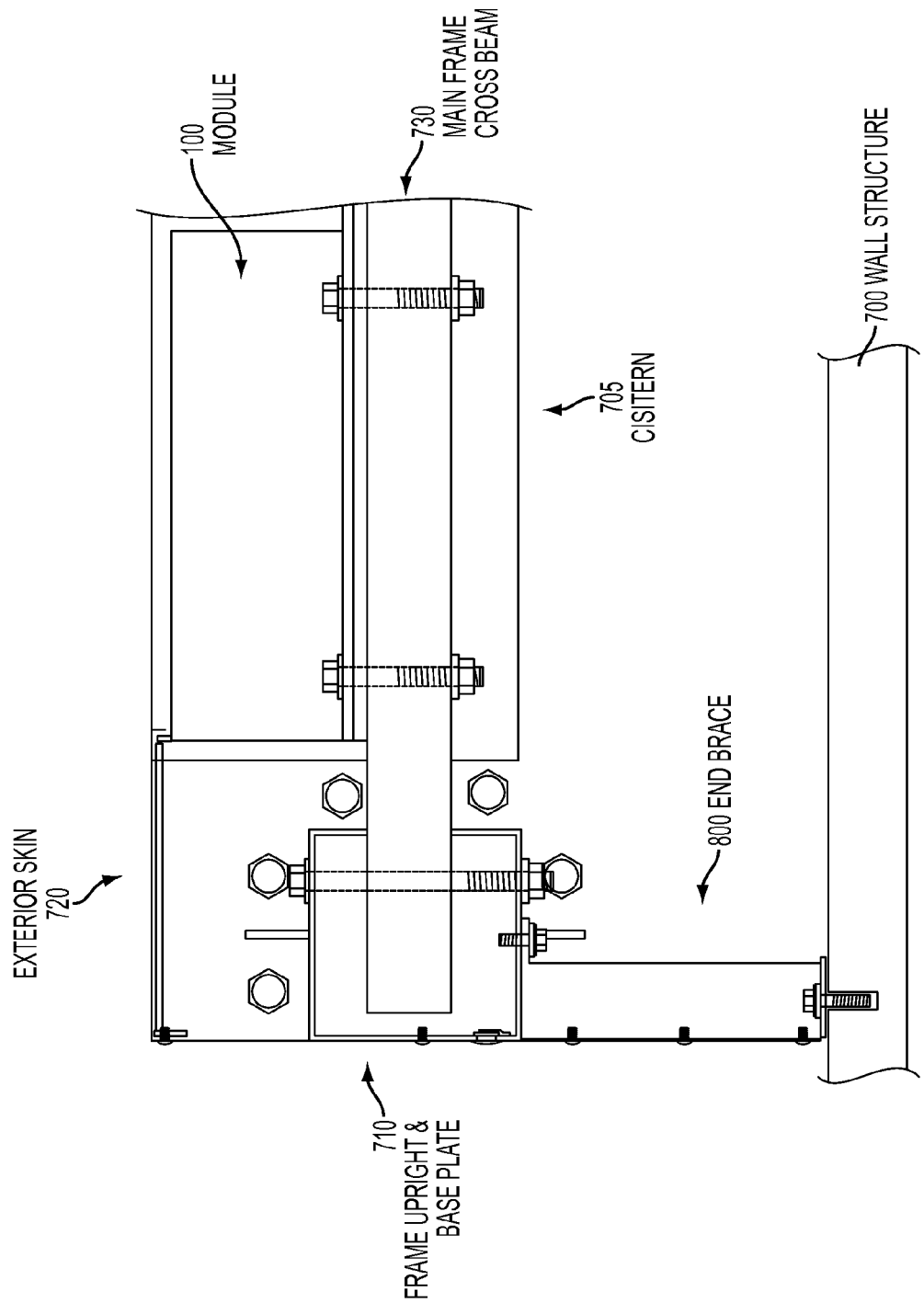
FIG. 8 provides a second top down view of support frame structure and end frame connection whereby a building wall structure 700 is connected by an end brace 800 to a frame upright and base plate 710 and also showing a cistern 705 below a module 100, exterior skin 720 and main frame cross beam 730; no rain barrel is shown in the cavity between the wall structure 700 and the grid wall.

FIG. 8 provides a second top down view of support frame structure and end frame connection whereby a building wall structure 700 is connected by an end brace 800 to a frame upright and base plate 710 and also showing a cistern 705 below a module 100. Exterior skin 720 is used to cover frame uprights. Again, the empty space between wall structure 700 and main frame cross beam 730 may be occupied by a rain barrel bag or rigid plastic structure 920. Referring to FIG. 16, rigid or flexible rain barrel 1670 is shown and will be described in connection with the discussion of a computer programmed controlled irrigation and lighting system for the planted green wall of FIG. 12.

FIG. 9(A) provides a third top down view of support frame structure and secondary beam and skin attachment connections whereby a vertical wall structure 700, for example, of a building is connected by another continuous hinge 707 to a frame upright and base plate 710. FIG. 9(A) also shows a cistern flange 705 below a module 100, a secondary cross beam 910 and exterior skin 720. The empty space between wall structure 700 and secondary cross beam 910 may be occupied by a rain barrel bag or rigid structure (not shown) for feeding cistern 705.

FIG. 9(B) provides a view of modules 100(1) to 100(4) mounted to a grid wall showing main frame cross beam 730 and a feed line manifold 940 for feeding horizontal feed lines 210(1) to 210(4). Wall structure 700 is not shown but would be visible to the left of FIG. 9(B) sandwiching a rain barrel between itself and a grid wall 1500. Modules 100(1) to 100(4) are separated by, for example, one to five millimeters from one another and, for example, module 100(1) is within the cross-sectional area of the top wall of module 100(2). As explained above, this prevents splash and theft. To the left proximate a grid wall 1500 are flexible bag or, in an alternative embodiment, recycled plastic compartments 920 of a rain barrel 1670 for receiving rain water from a rain catch 1130 and/or a rain gutter or drain system associated, for example, with a roof or drain by gravity feed. Compartment 920(1) to 920(4) may provide capillary rain feed 940 through grid wall (FIG. 15) openings to respective modules 100(1) to 100(4) via apertures 119. As described above, compartment 920(1) may be more rigid than other rain barrel compartments and have a shut-off valve for shutting off water to rain barrel 920 from roof gutters, drains and any rain catch. Such as shut-off valve may be a float valve or other known shut-off valve.

FIG. 10(A) provides details of a frame upright 1000. FIG. 10(B) shows upright 1000 details including an interlocking socket 1010. Frame upright 1000 may be, for example, about 12 feet high or other dimension sized by the installation. The frame upright may be telescoped and locked by known devices to appropriate height in one embodiment (not shown). The interlocking socket 1010 may be four inches deep and two inches wide and be used to attach a further section of frame upright or a rain catcher 1130 above a lower frame upright at socket 1010. The frame upright 1000 may be mounted in a concrete or other footer, for example, of porous concrete sufficiently engineered to bear the weight of the planted green wall and a maximum weight of a rigid or flexible rain barrel 920, 1670.

FIG. 11 provides further details of a frame upright 1000 including "u" connectors on one side and circular connectors on another for horizontal rods and members for forming a grid wall where FIG. 11(A) provides detail of "u" support 1110; FIG. 11(B) provides detail of circular support 1112 and FIG. 11(C) provides detail of a grid wall including a rain catch 1130 and a cistern 705. For example, the rain catch 1130 may be twelve feet above ground level. As indicated above, the frame upright 1000 supports main frame cross beam 730, secondary cross beam 910, horizontal rods 500 and the like. These, in turn, together with frame uprights, support the modules 100 and rain barrel 920, 1670 and a rain catch 1130 above the green wall. Rain catch 1130 may drip rain to the top-most horizontal row of modules 100 and rain barrel 920, 1670 of the green wall having apertures spaced above the modules 100 and rain barrel 920, 1670.

FIG. 12 provides a front view of a typical vertical green wall associated with a vertical building wall 700 (not shown) including plantings within modules 100 where cistern 705 and rain catch 1130 are shown along with representative dimensions. In this view, a grid of 12 modules 100 by 12 modules 100 provides roughly 144 square feet of vertical green wall. Cistern 705 is shown below the modules 100 and rain catch 1130 is shown above the modules 100 with frame supports at each side. The total representative dimensions are, for example, 13 feet 4" wide by 14' 3" high. A solar panel (not shown) (FIG. 16, panels 1650) may be provided at the top of a green wall or on a roof of the building structure for providing power to a battery and power system for a controlled irrigation and lighting system as will be described in reference to FIG. 16. The solar panel 1650 may be equipped with rain gutters for catching rain water falling off the typically slanted solar panels for feeding a rigid or flexible rain barrel 920, 1670 mounted between the grid wall 1500 (FIG. 15), green wall modules 100 and plantings of FIG. 12 and the wall structure 700 of FIG. 7.

Figure 13:
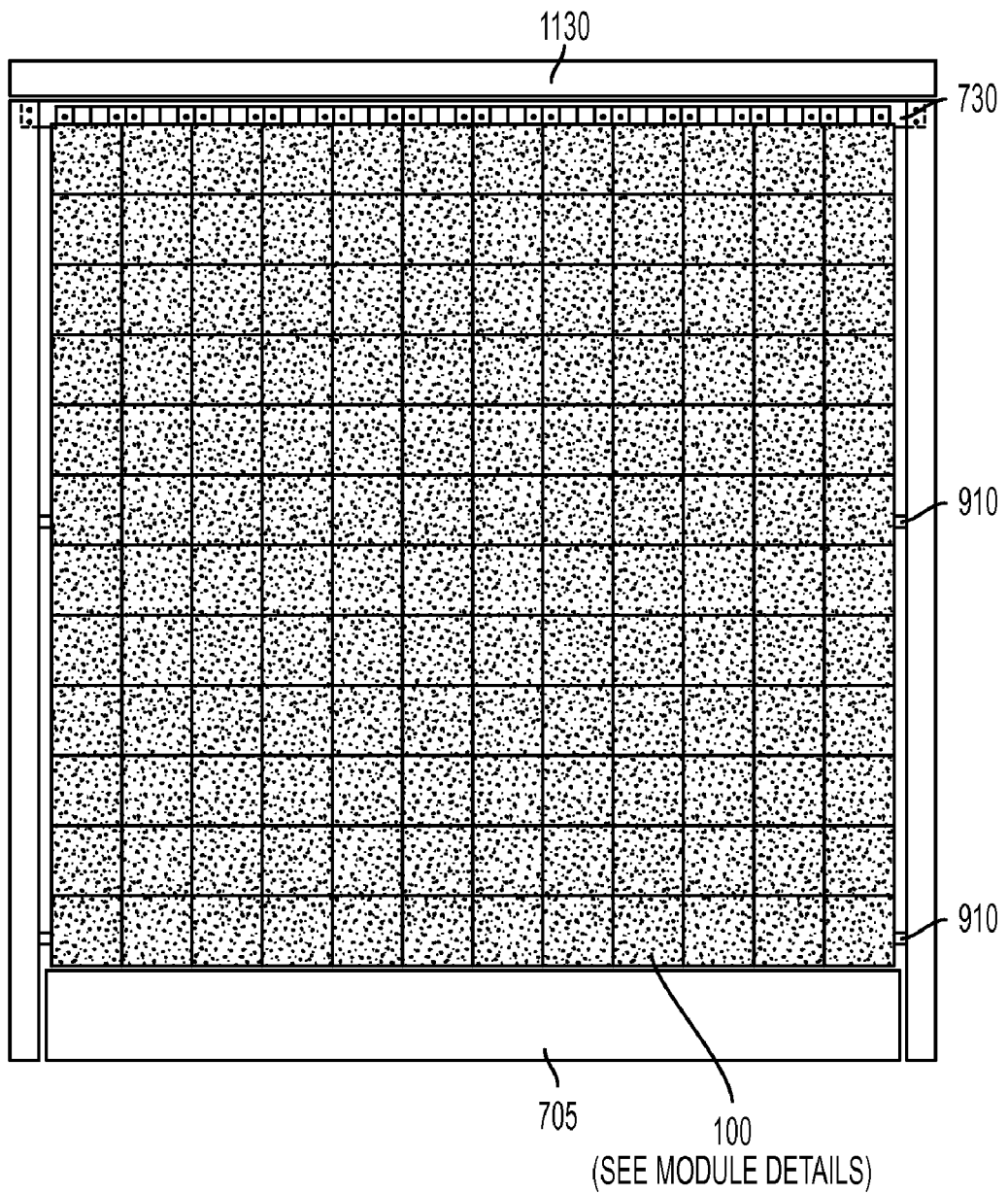
FIG. 13 provides a further front view of a typical green wall including plantings within modules 100 where cistern 705 and rain catch 1130 are shown.

FIG. 13 provides a further front view of an alternative embodiment of a typical green wall including plantings within modules 100. In this view, rain catch 1130 is shown having exemplary dimensions of 6" by 160" approximately. There may be small gaps between 12 foot by 12 foot modular green wall module 100 structure and supports 1000. Vertical support frames are, for example, 5" wide and separated by 0.2" from cistern 705. A main support frame 730 is shown and secondary cross beams 910 are shown.

Figure 14:
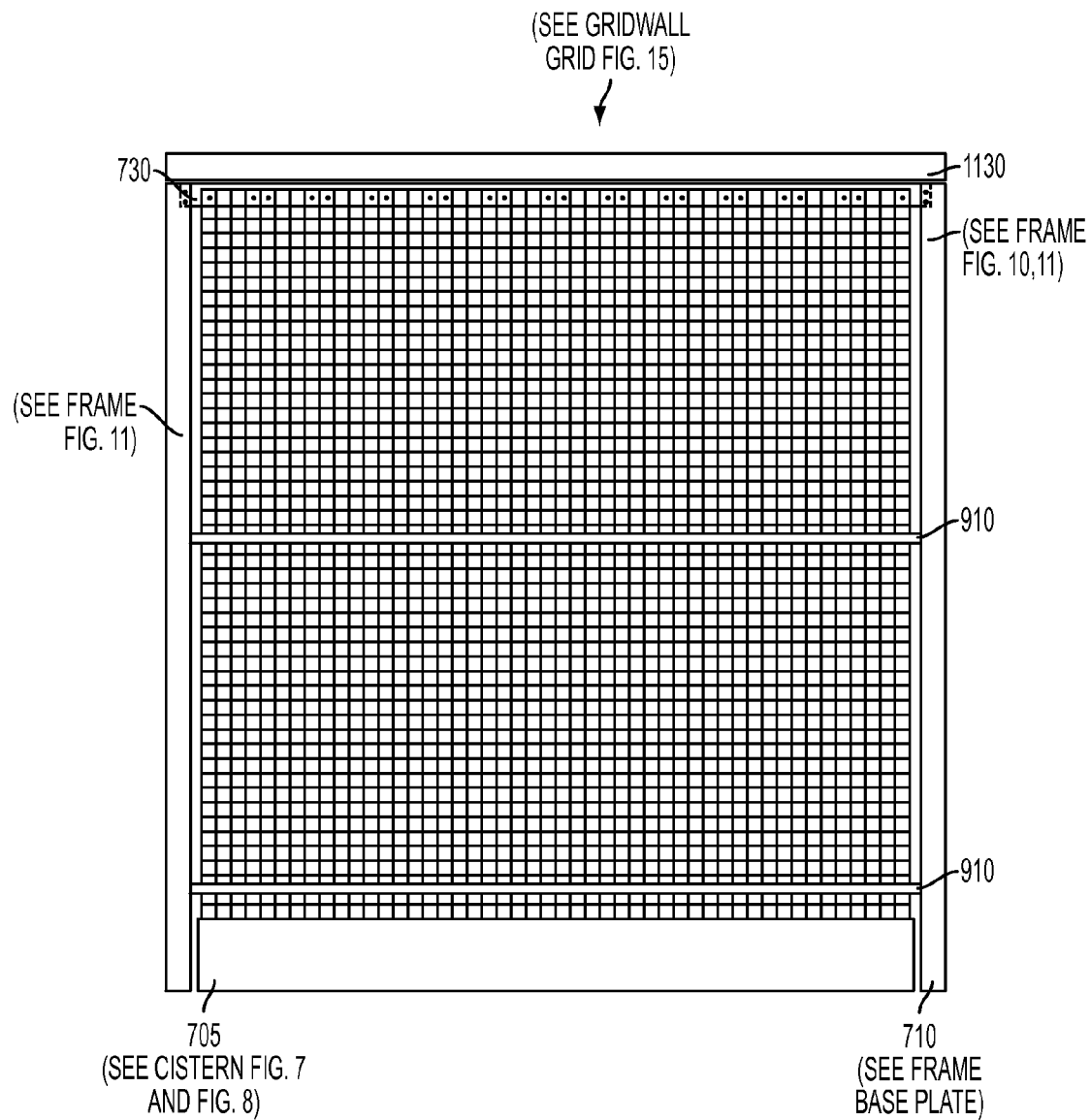
FIG. 14 provides yet another front view of a typical green wall without plantings or modules 100 where the grid wall may be seen in some detail as well as cistern 705 and rain catch 1130.

FIG. 14 provides yet another front view of a typical green wall without plantings or modules 100 where the grid wall may be seen in some detail. The grid wall comprises a grid of vertical rods tied to horizontal rods 500. On the horizontal rods 500 are mounted the modules 100 by catches 130 and the rain barrel compartments, for example, on every other rod 500. Cistern 705 is seen below the grid wall and rain catch 1130 above the green wall. A main support frame 730 is shown and secondary cross beams 910 are shown.

FIG. 15 provides details of a grid wall for supporting a plurality of modules 100. Stronger vertical rods may be positioned as each eighth rod at approximately two foot intervals. These stronger rods may have a diameter of ½" compared with other vertical rods having a diameter of ¼". Horizontal rods 500 are shown as well which may be welded to vertical rods.

Figure 16:
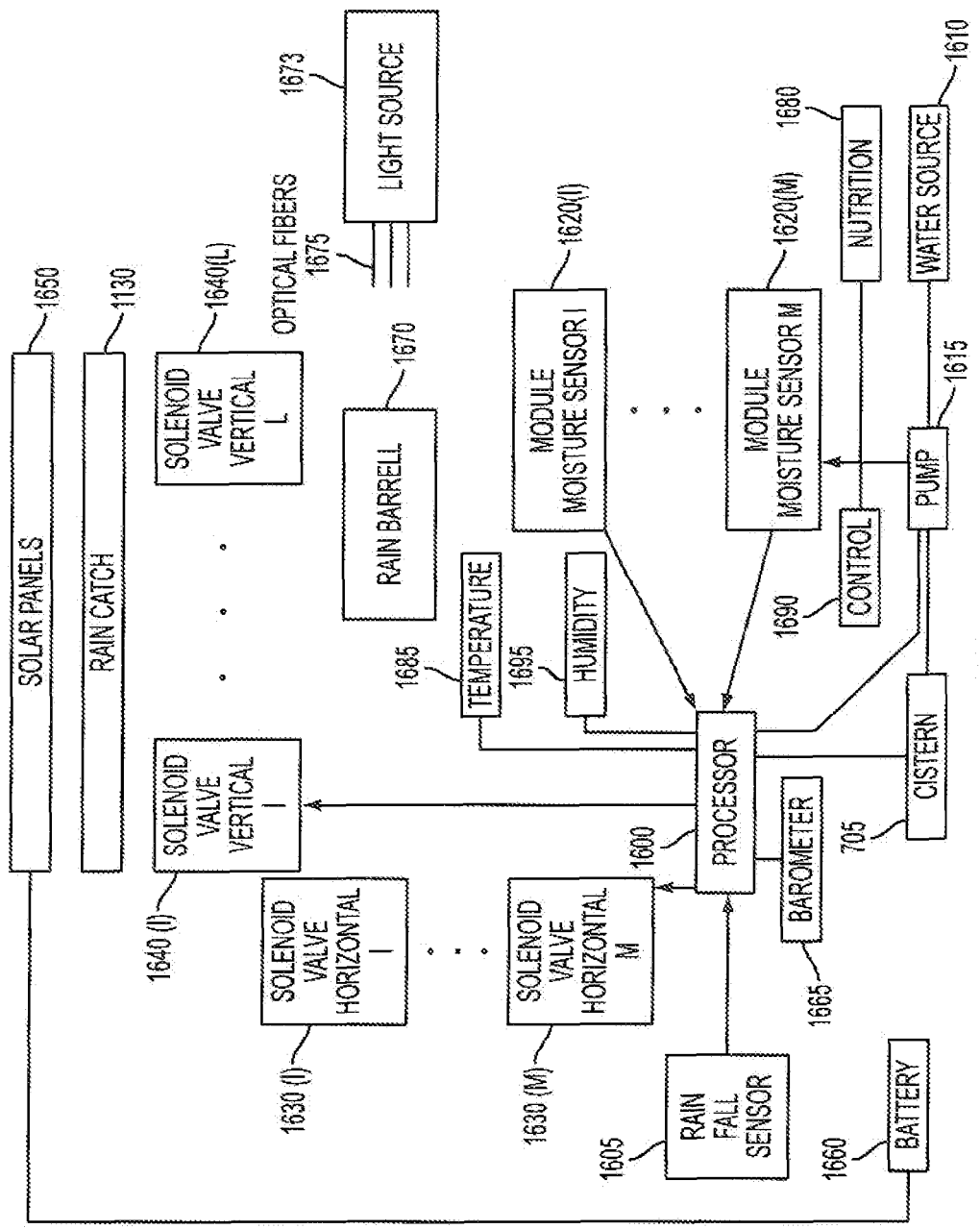
FIG. 16 provides a schematic block diagram of an irrigation and lighting control system for a green wall structure in accordance with FIGS. 1-15.

FIG. 16 provides a schematic block diagram of an irrigation control and lighting system for a green wall structure in accordance with FIGS. 1-15. A processor 1600 may be a conventional processor having memory and programmable input (not shown). Possible optional input sensors will now be discussed in detail for recording along with a time of day and date in memory of processor 1600. The processor is specially programmed to measure rain fall and record the fall of rain via rain fall sensor 1605. Via, for example, a float sensor in cistern 705 and one or more float sensor valves in flexible or rigid rain barrel 920, 1670, the processor 1600 may record the depth and so the volume of water collected in cistern 705 and rain barrel 920, 1670. Each module 100 may be equipped with a moisture sensor 1620 so that there may be, for example, 144 moisture sensors 1620(1) to 1620(M) where M may be 144 or 12 modules by 12 modules. Other sensors shown include temperature (thermometer) 1685 for recording exterior temperature, humidity sensor 1695 for providing a recording of humidity and barometer 1665 for forecasting the weather. These are optional sensors that provide additional useful input for regulating water flow in an irrigation system of one embodiment. Other sensors may come to mind of one of ordinary skill in the art, for example, sensors of planting growth medium acidity and nutrient level (soil testing).

A timed watering system for watering plants including a moisture sensor similar to moisture sensor 1620 placed in planting medium is described by Schmidt, US 2008/0302002, whose disclosure is incorporated herein by reference in its entirety. The embodiment of FIG. 16 does not utilize time for control so much as weather indicators and other sensors. Moisture sensors 1620 provide the processor 1600 with input as to the moisture content of each module 100 and, potentially, each planting box within a module 100 and thus a measurement of need for water. Each module 100 may be equipped with soil testing sensors (not shown) for nutrient regulation. A nutrient source 1680 is shown feeding nutrient at the feed side of pump 1615 to horizontal and vertical piping having known pump output where the horizontal piping/hoses 210 is integral to modules 100. In this manner, a known concentration of nutrient may be provided by control valve 1690.

A plurality of water control valves, for example, horizontal solenoid valves 1630(1) through 1630(n) and vertical control valves 1640(1) through 1640(1) may be controlled to open and close piping to a particular module or plurality of modules 100 that need water at a particular time depending on sensor 1620 input to processor 1600. Pump 1615 is alternatively controlled to provide water from cistern 705 (if there is sufficient water in the cistern) or from an external source of water 1610.

It is expected that external water source 1610 will be used sparingly. Rain barrel 920, 1670 may be provided with run-off water from gutters, for example, of horizontal and slanted roofs or drains of flat roofs and may be regulated to refill cistern 705 by processor 1600 by appropriate valves and piping not shown. Many of the components of an irrigation system of FIG. 16 are commercially available from DRAMM Corporation of Manitowoc, Wis. Rain catch 1130 may catch rain and drip water to the modules 100 below as described above or, in extreme heavy rain conditions, provide overflow water to rain barrel 1670.

Solar panel 1650 in cooperation with batteries 1660 and other sources of power may provide power to all modules requiring same, for example, processor 1600 and lighting system 1673 for providing light under control of processor 1600 via optical fibers 1675 when flowers are not blooming or for advertising purposes. A power meter for solar panels 1650 may provide an indication of sun, clouds and night when dew conditions may assist in watering plantings of modules 100 in conditions of high humidity via meter 1695. Alternatively, a separate light meter (not shown) may indicate sun, clouds and night to processor 1600. Processor 1600 memory may contain data of calendar year season and typical weather conditions to, for example, verify accuracy of the data collected from provided sensors. Of course, processor 1600 may be a specially programmed application specific integrated circuit or logic circuit and need not comprise a personal computer or other large processor.

Light source 1673 for feeding optical fibers 1675 may be controlled and utilized in a number of ways via programmed processor 1600. If the programmed processor controls optical fibers 1675 arranged for advertising purposes, the optical fibers 1675 arranged in the form of an advertisement may receive light according to a timer of processor 1600, for example, determined by expected nightfall and lack of traffic (for example, at 12:00 midnight). Alternatively, a light sensor or a power meter of solar panels 1650 may indicate an actual time when light level falls below a predetermined level for turning the optical advertising fibers 1675 on via a switch not shown.

For use in identifying blooming periods and, more particularly, periods when flowers are not blooming and a selected portion of the optical fibers 1675 are switched on to provide an artificial flower display, there may be stored normal blooming data for the plantings of modules 100 in memory which may be further supplemented by weather condition measurement to begin and end artificial blooming periods based on actual weather conditions that deviate from the norm and nutrient feeding levels that may impact blooming.

The principles of application of the several discussed embodiments of a green wall structure and method of constructing same for, for example, providing a detriment to storm water run-off, promoting noise abatement and promoting energy conservation may be extended to other embodiments or various shapes and sizes such as for mounting other types of plants of different shapes and sizes. These and other features of embodiments and aspects of a green wall assembly including a grid wall, support structure and irrigation/lighting system may come to mind from reading the above detailed description, and any claimed invention should be only deemed limited by the scope of the claims to follow.

What I claim is:

1. A modular apparatus for constructing a green wall, said modular apparatus adapted to display plantings substantially horizontally when said modular apparatus is mounted to a vertical side grid wall associated with a wall of a fixed structure, said modular apparatus comprising:
a plurality of planting boxes of said modular apparatus, the modular apparatus for mounting to said wall of said fixed structure via said grid wall and the planting boxes for receiving said plantings;
said planting boxes and modular apparatus having opposing first and second substantially flat side walls;
a rear wall of said modular apparatus for mounting to said grid wall associated with a fixed structure wall by downward-locking catching apparatus;
a top wall of said modular apparatus having a concave cross-section and a slot extending vertically downward, the slot disposed off-center of said concave cross-section, said slot having an aperture at the bottom, said top wall for receiving water in said slot for delivery to said plantings;
a bottom wall of said modular apparatus having a convex cross-section, said bottom wall of one modular apparatus adapted to be received within the cross-sectional area of a top wall of an immediately adjacent, vertically lower modular apparatus such that an irrigation gap of between one and five millimeters is provided between the walls, said bottom wall of convex cross-section further adapted to collect water on a top convex surface and being provided with an aperture disposed off-center of said convex cross-section, the bottom wall for collecting and retaining water received at said top convex surface, said aperture for permitting water to be received at said top wall of one of an immediately lower modular apparatus of said green wall and a cistern; and
a louver disposed between said top wall and said bottom wall for fixed connection to said side walls and said rear wall at a predetermined upward angle and having an aperture disposed in said louver opposite said rear wall, said louver separating said modular apparatus into upper and lower planting boxes, said louver for collecting and retaining water received at a top surface of said louver and for delivery of water by gravity flow to plantings planted below in a lower planting box of said modular apparatus.

2. The modular apparatus of claim 1, the top wall having barbs on a bottom surface thereof for retention of planting material.

3. The modular apparatus of claim 1, each side wall having barbs on an inner surface thereof for retention of planting material.

4. The modular apparatus of claim 3, said barbs of each said side wall being formed in vertically adjacent, parallel rows opposite said rear wall for retaining planting material.

5. The modular apparatus of claim 1, said aperture of said slot of said top wall comprising a plurality of slits along the length of the slot.

6. The modular apparatus of claim 5, the slot of said top wall adapted to receive an irrigation pipe along the length of the slot.

7. The modular apparatus of claim 1, said rear wall having apertures for receiving light fibers, the light fibers adapted to extend through the apertures, plant material and associated plantings and adapted to provide light visible through said plantings.

8. The modular apparatus of claim 1 for constructing a vertical green wall of two of said modular apparatus, wherein said plurality of planting boxes comprise two of said planting boxes, each modular apparatus comprises two planting boxes separated by said louver, a top modular apparatus when mounted to said grid wall adapted to have a water collecting trough mounted to the grid wall associated with the fixed structure wall above the top planting box of the top modular apparatus, the trough having an aperture, the trough for collecting and retaining water and providing said water to said top concave surface of said top wall for vertical delivery by gravity flow to said slot of said top wall.

9. The modular apparatus of claim 1 for constructing a vertical green wall of two of said modular apparatus, one mounted on top of the other, the bottom modular apparatus when mounted to a wall adapted to have a water collecting cistern mounted below the bottom modular apparatus at the bottom of the grid wall, the cistern associated with said fixed structure wall for collecting water for pumping to said modular apparatus.

10. The modular apparatus of claim 9 further comprising a rain sensor, a pump for connection to horizontal pipes fed lengthwise through said slots, a water level sensor of a cistern and said rain sensor, and further comprising a processor for controlling flow of water from said cistern to said horizontal pipes and for regulating an amount of water receivable from an external source of water.

11. The modular apparatus of claim 1, said first and second side walls having first and second louvers disposed between said top wall and said bottom wall for fixed connection to said side walls at a predetermined angle and to said rear wall, each louver having an aperture disposed opposite said rear wall, said first and second louvers for collecting and retaining water received at a top surface, each said louver having a substantially flat top surface, said louvers in cooperation with said top and bottom walls forming three planting boxes for planting material and for receiving substantially horizontal plantings facing outward when said modular apparatus is associated with said fixed vertical wall of said structure.

12. The modular apparatus of claim 11, said side walls having an aperture approximately centrally located between said first and second louvers and an aperture approximately centrally located between a bottom-most louver and said bottom convex wall for zip tie connection to an adjacent modular apparatus.

13. The modular apparatus of claim 12 wherein said aperture approximately centrally located between said first and second louvers comprises first and second apertures and said aperture centrally located between said bottom-most louver and said bottom convex wall comprises first and second apertures.

14. The modular apparatus of claim 12 wherein said aperture of each of said first louver and said second louver comprises a plurality of apertures disposed length-wise in a row.

15. The modular apparatus of claim 1, said mounting apparatus comprising a catch connector fixed to said rear wall for downwardly mounting said modular apparatus to a horizontal rod of a grid wall, a vertical support structure of the grid wall for attachment to said wall of said fixed structure, the modular apparatus having weight substantially born by the ground proximate to said vertical support structure of the grid wall associated with said fixed vertical structure.

16. The modular apparatus of claim 15, said vertical support structure comprising mounting brackets for mounting said grid wall via cross beams and horizontal rods of said grid wall, said horizontal rod for fixedly downwardly receiving said connector of said rear wall of said modular apparatus.

17. The modular apparatus of claim 1, said concave top wall having a substantially circular arc cross section top surface and said convex bottom wall having a corresponding circular arc cross section.

18. The modular apparatus of claim 1, said concave top wall having a U shaped cross section of a rear slanted side for said slot having a predetermined angle with respect to the vertical, a front slanted side having the same predetermined angle with respect to the vertical, and a horizontal bottom side.

19. The modular apparatus of claim 1 wherein said aperture of said bottom wall comprises a plurality of apertures disposed length-wise in a row proximate and parallel to said rear wall.

20. The modular apparatus of claim 1, the slot disposed off-center of said concave cross-section being disposed between said rear wall and a center of said concave cross-section.

* * * * *